INVENTOR.
Louis Borins,
BY Maurice H. Slud,
Maurice J. Zubkoff,
John S. Powers.
ATTORNEY.

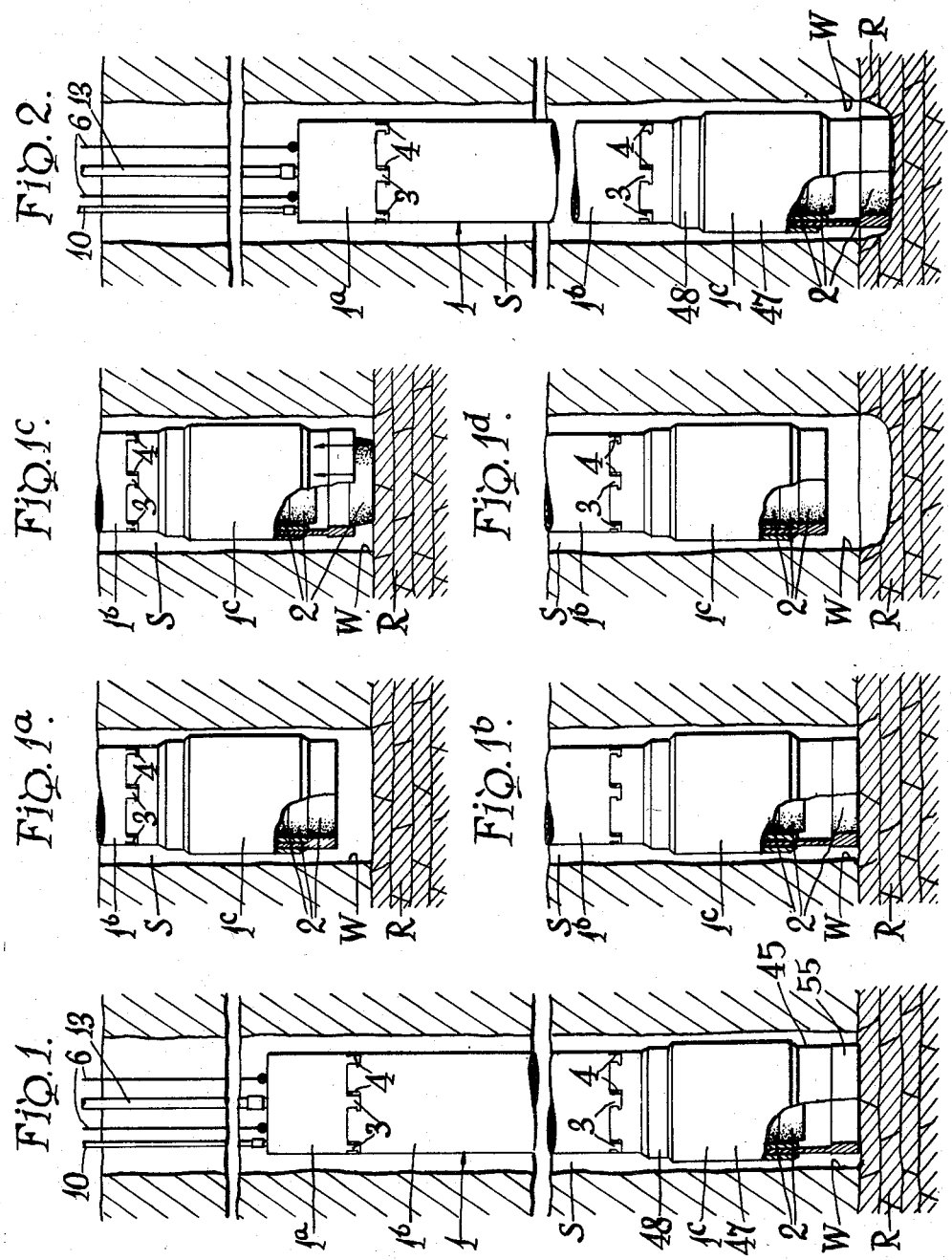

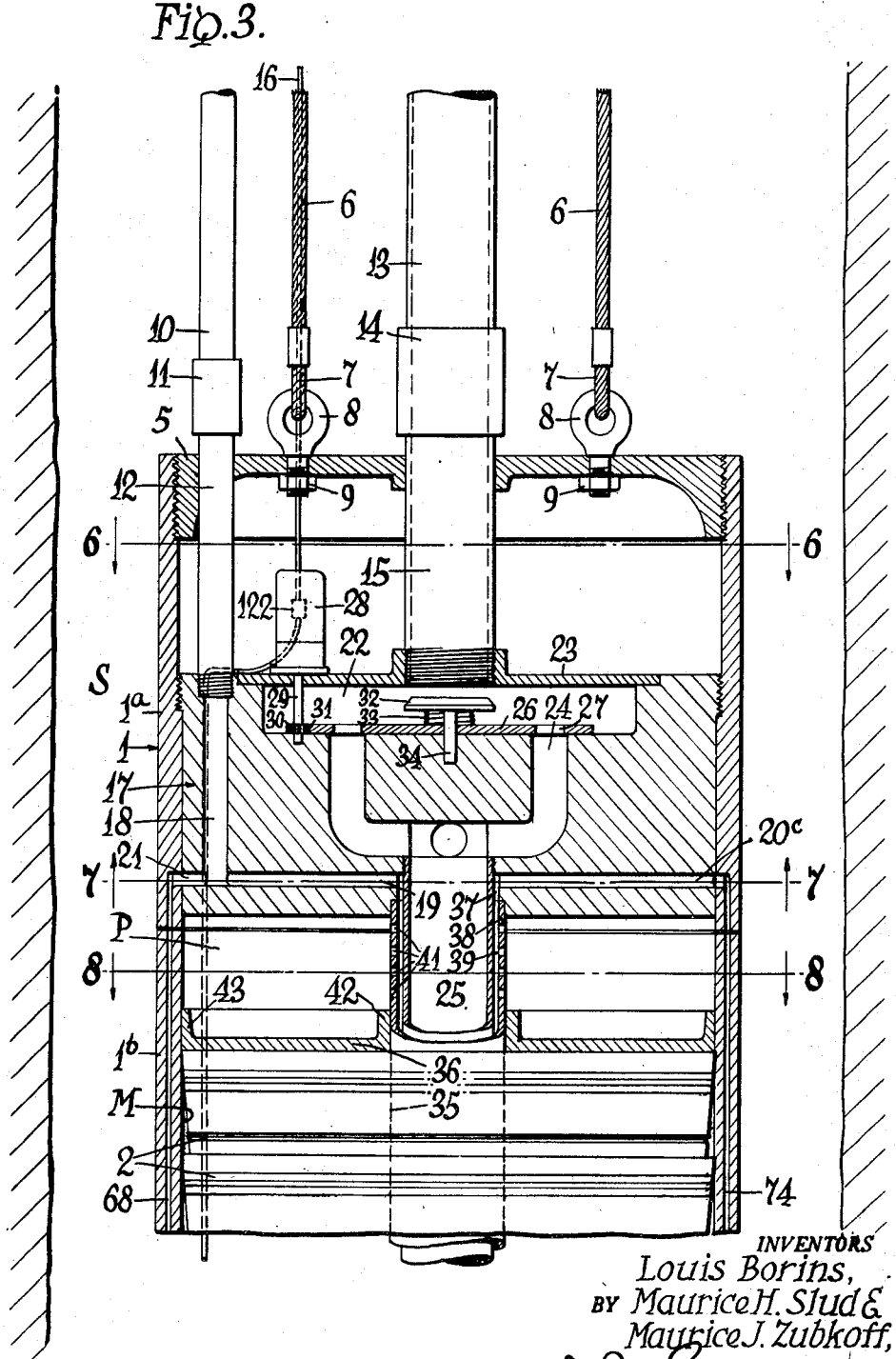

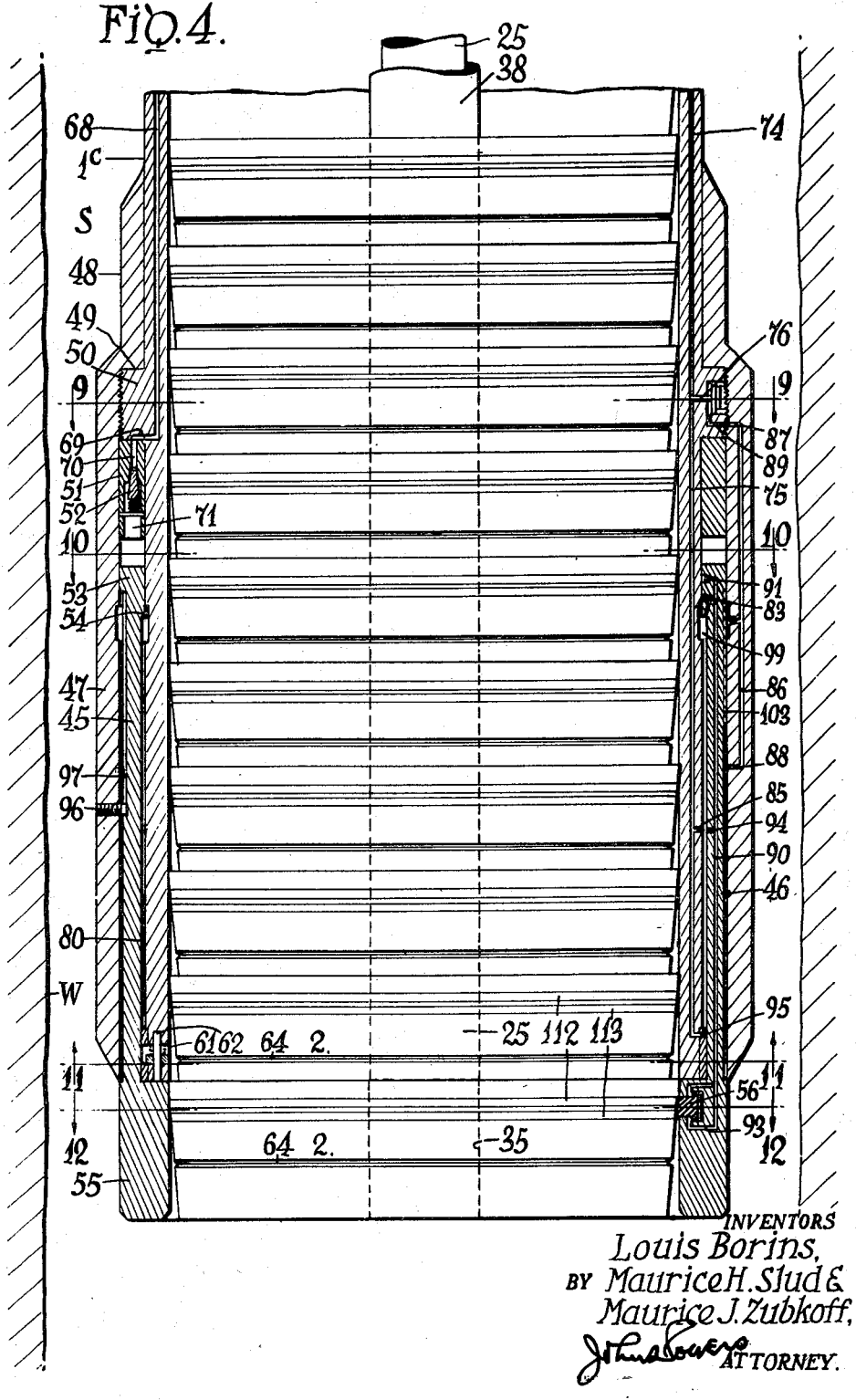

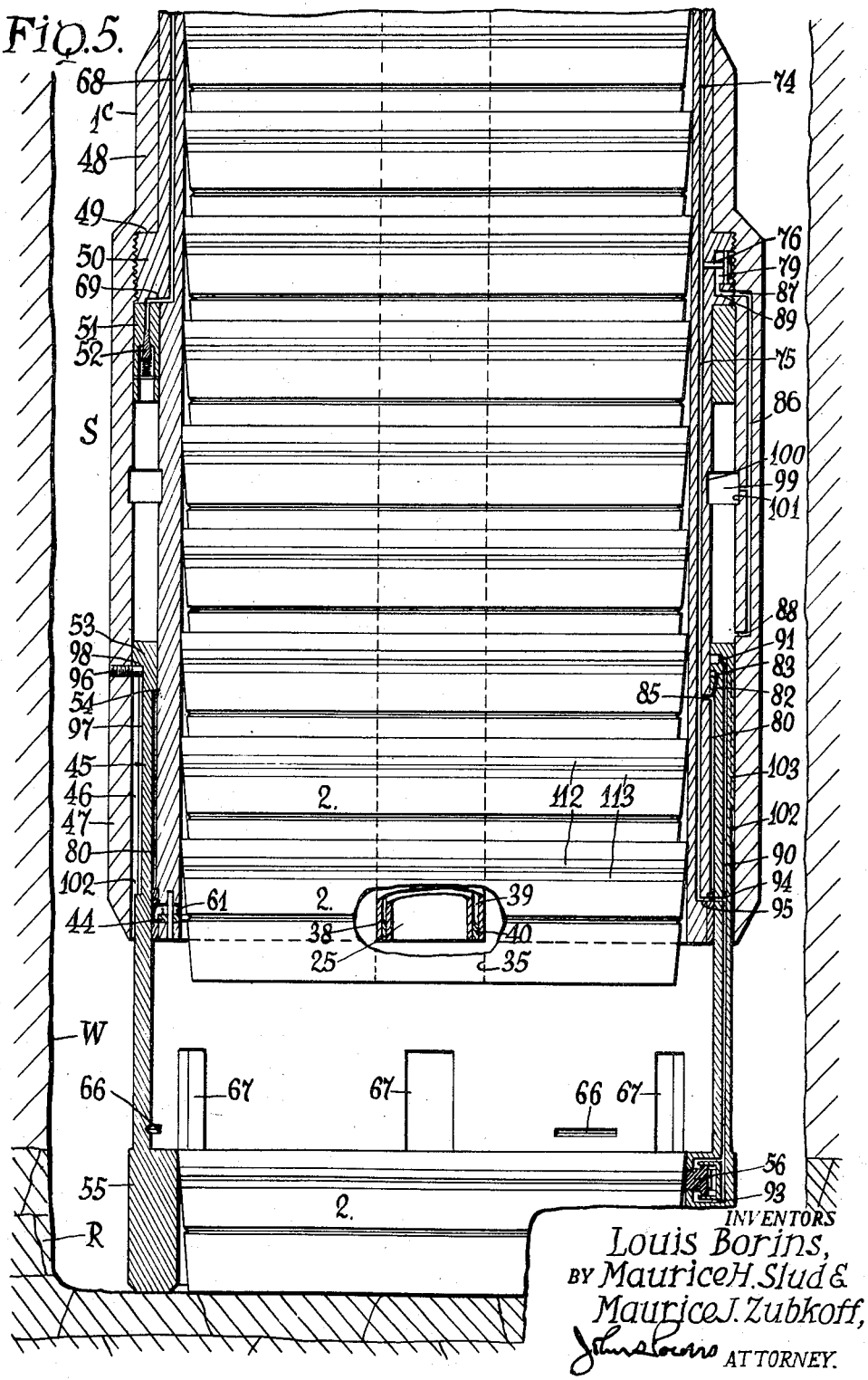

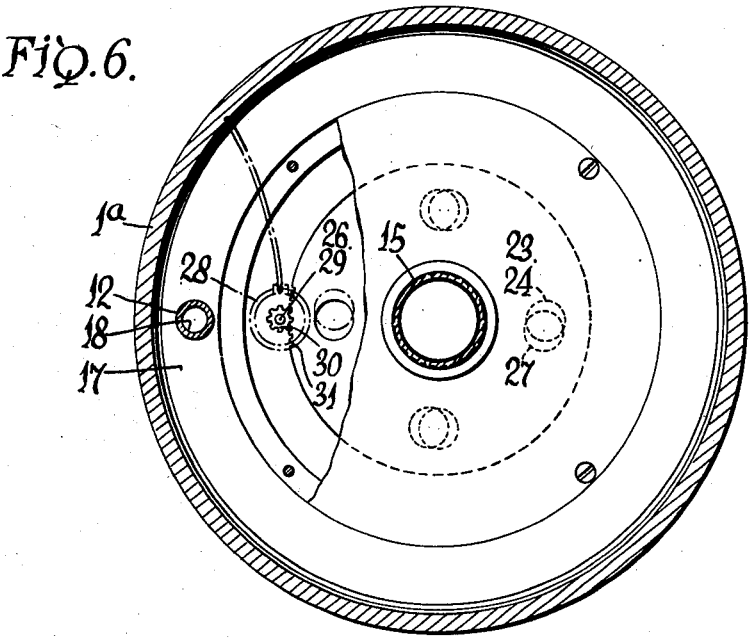
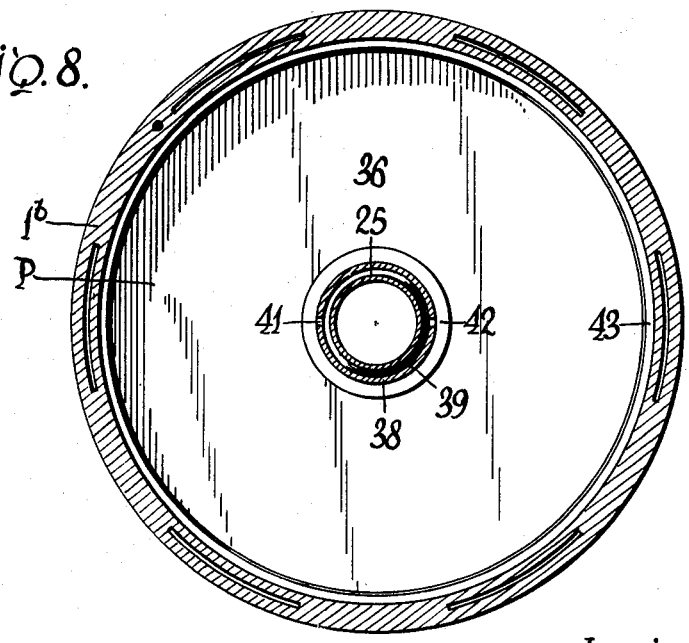

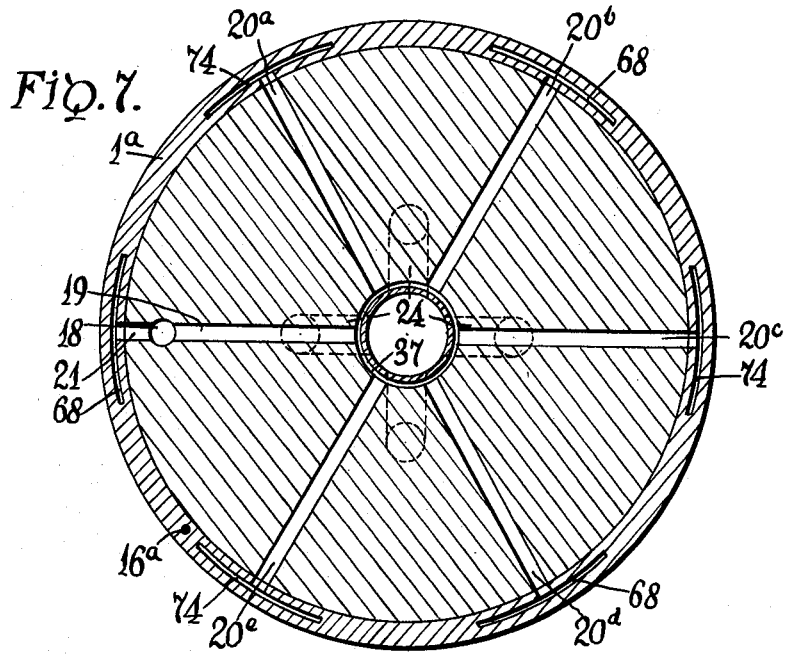
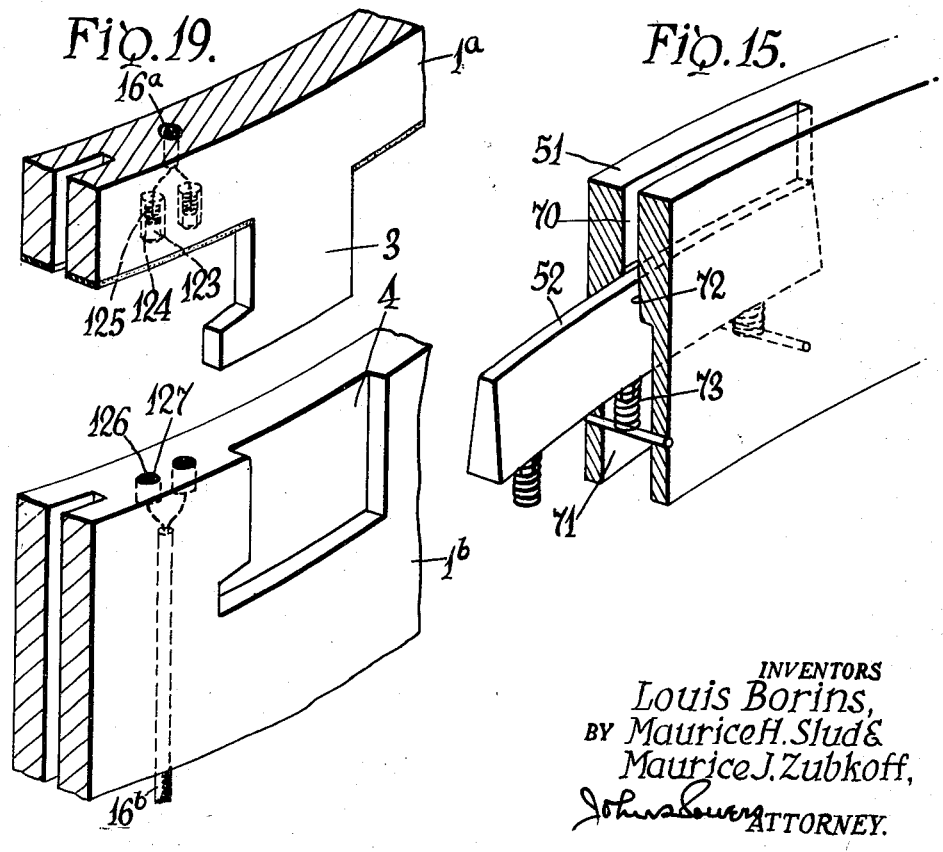

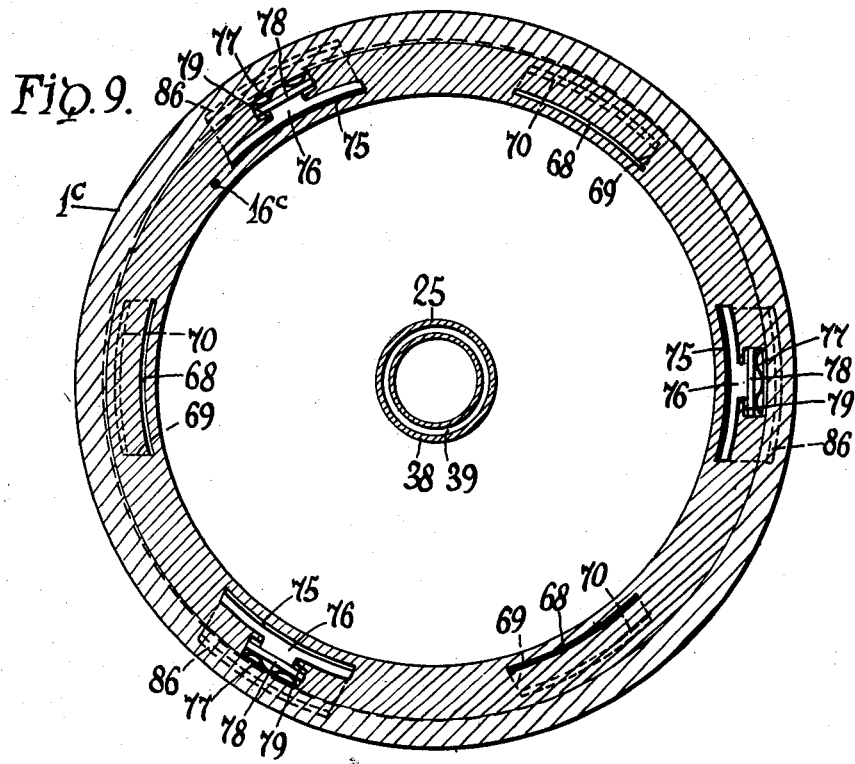
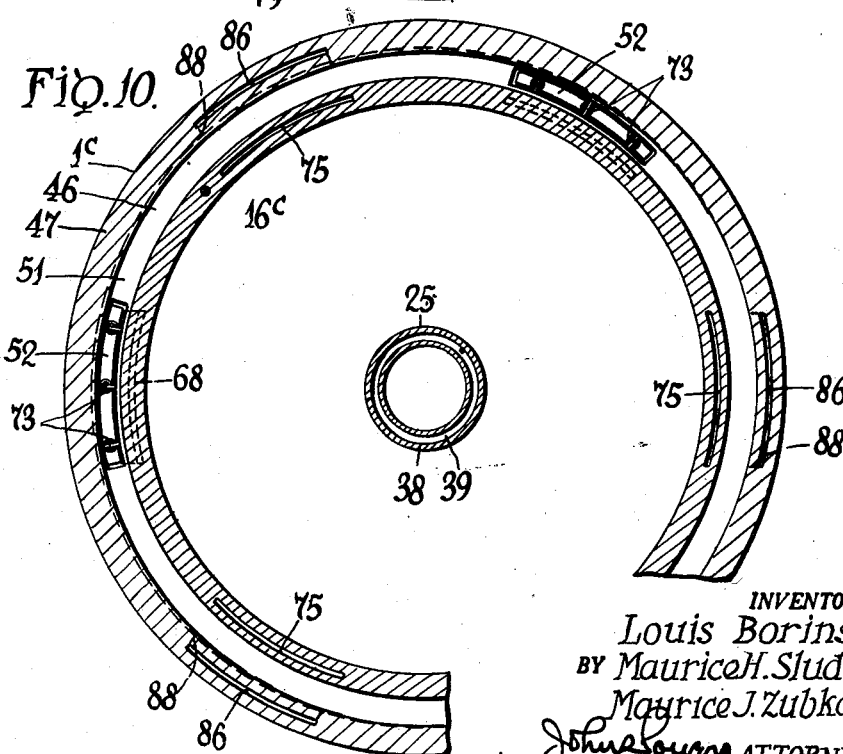

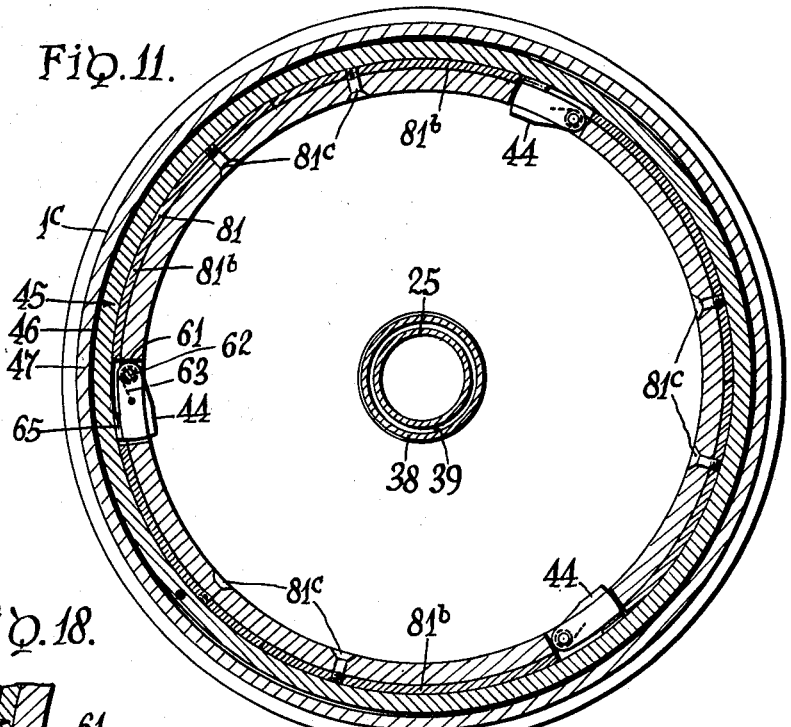
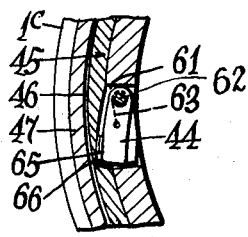
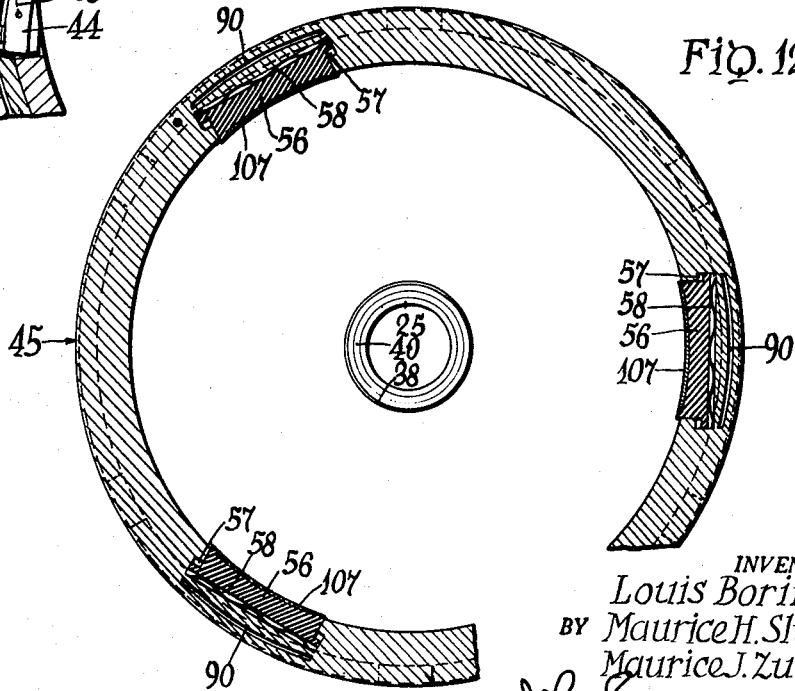

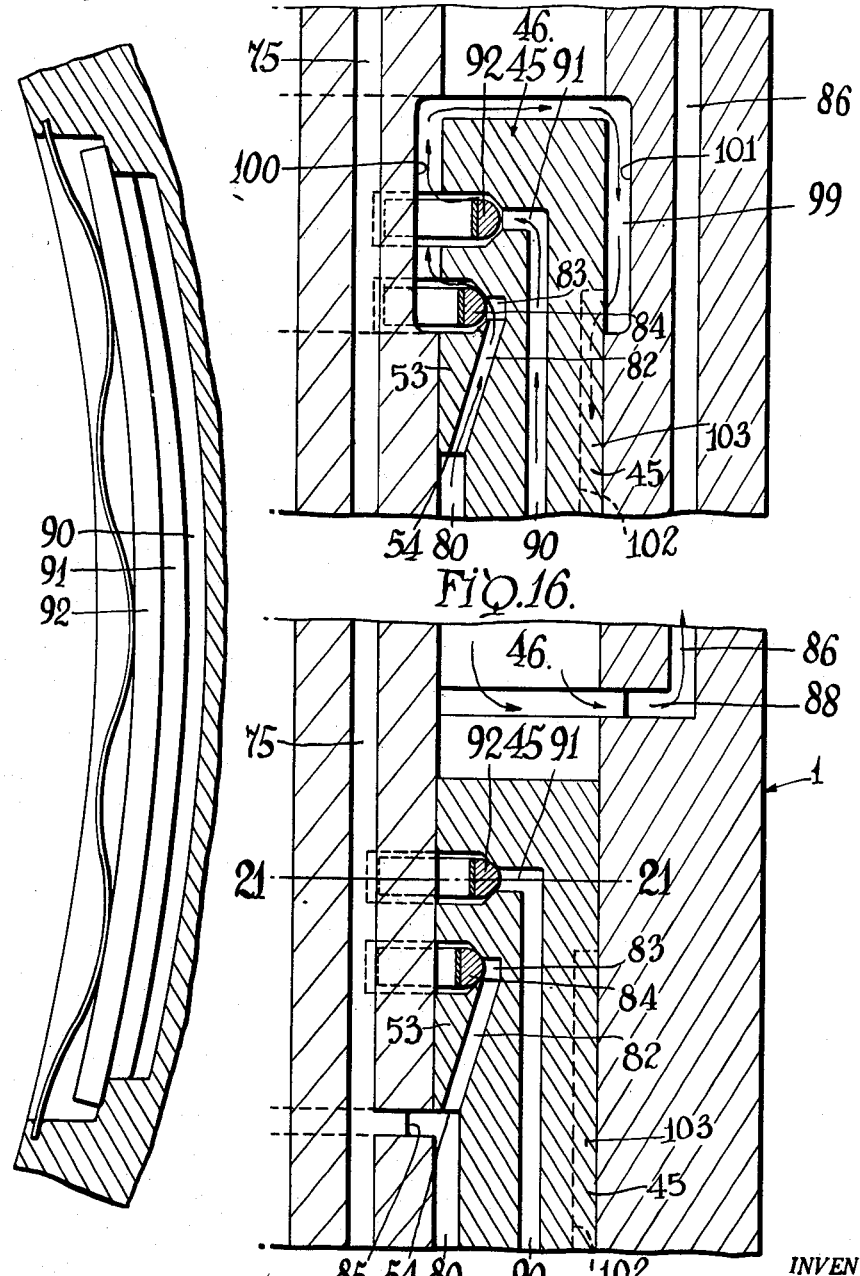

May 17, 1960 L. BORINS ET AL 2,936,708
DETONATIVE ELEMENT OF APPARATUS FOR SINKING WELLS
BY MEANS OF EXPLOSIVE CHARGES
Original Filed Feb. 21, 1957 15 Sheets-Sheet 11

INVENTORS
Louis Borins,
BY Maurice H. Slud &
Maurice J. Zubkoff,
ATTORNEY.

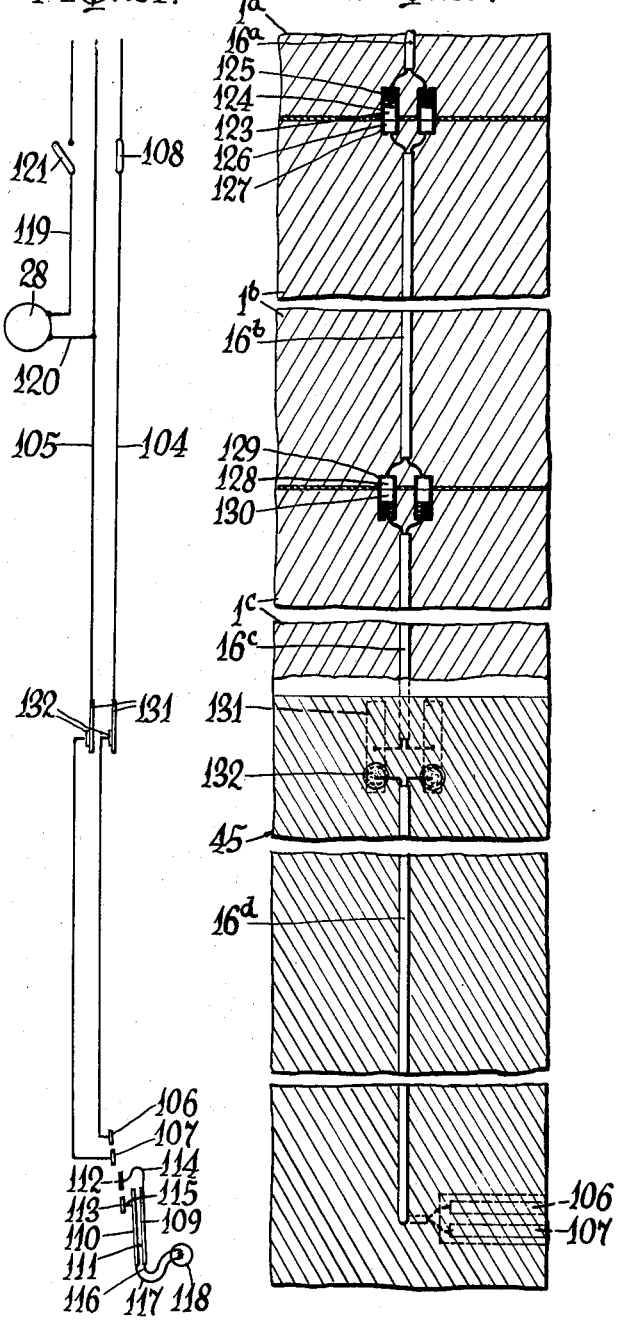

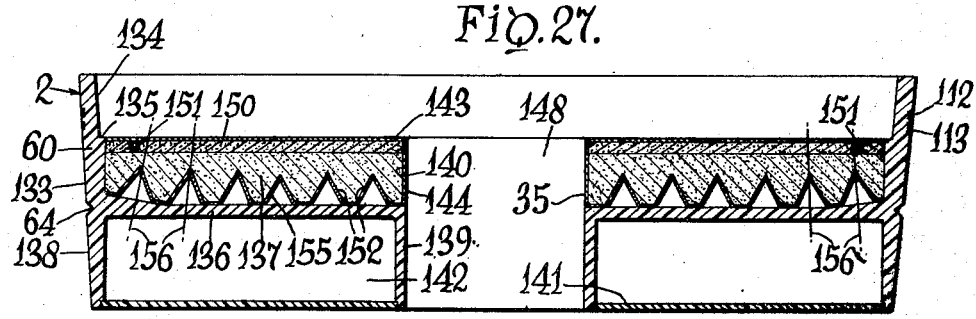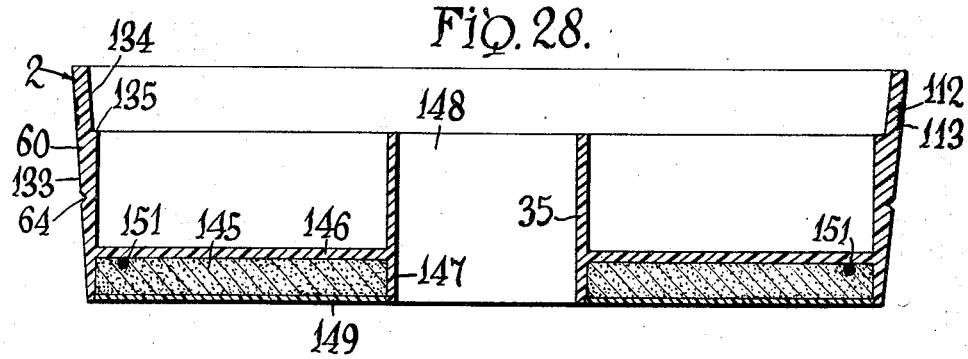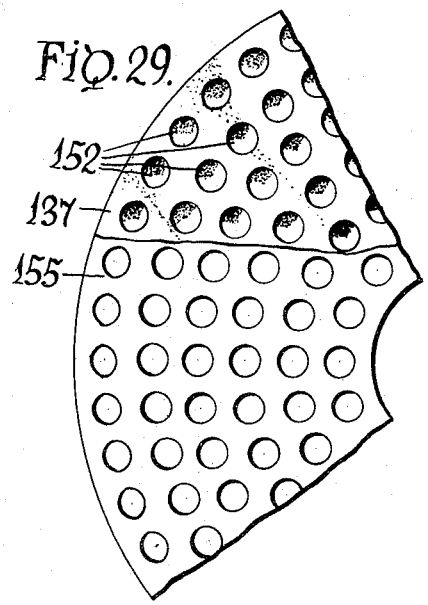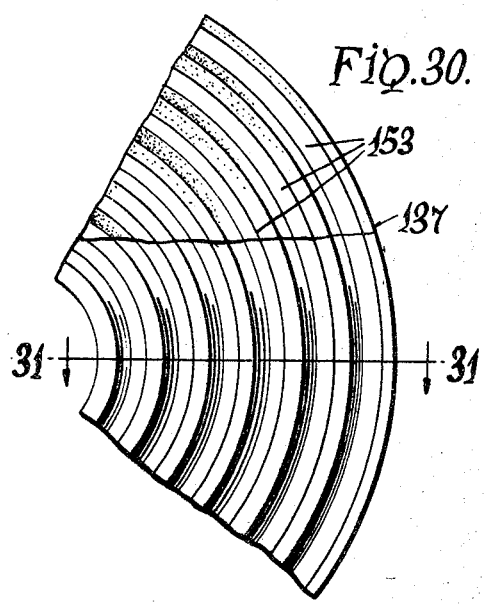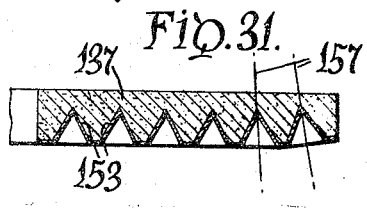

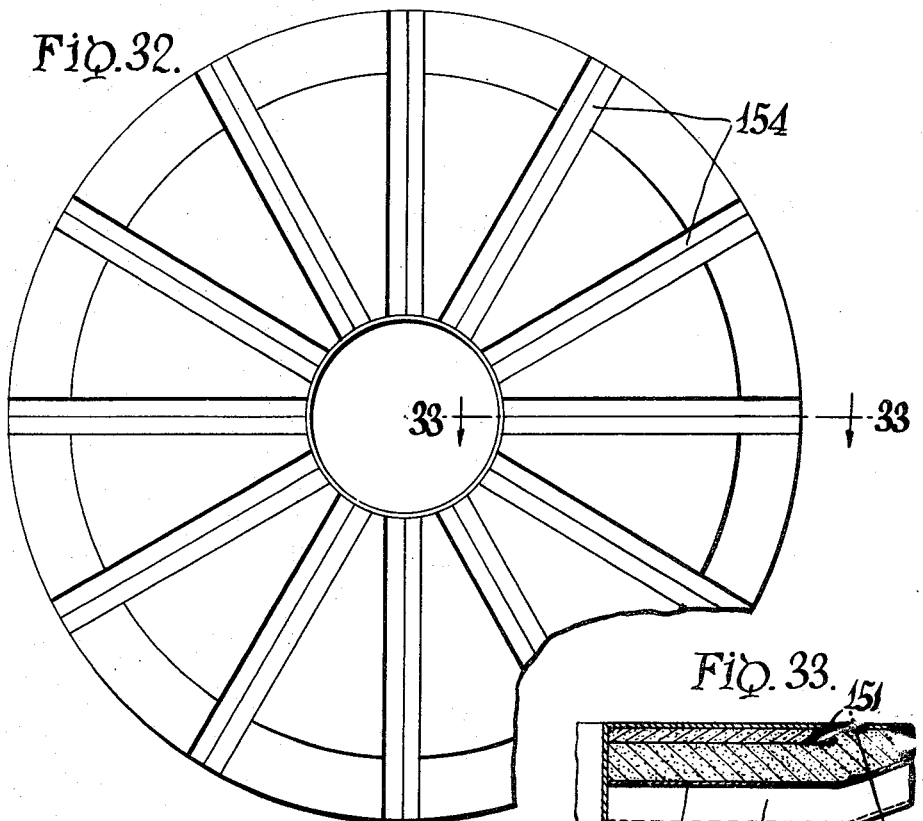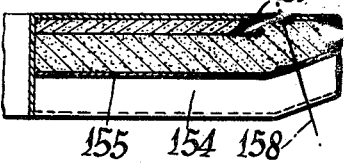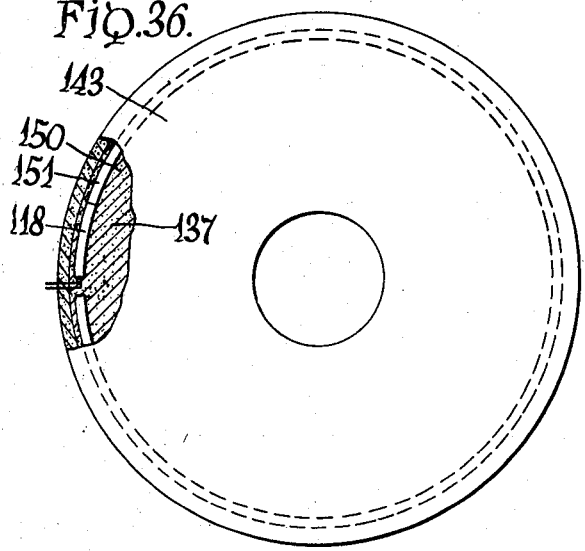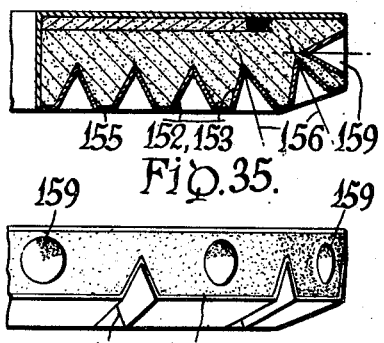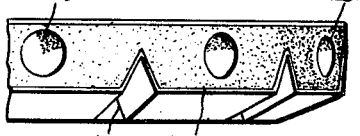

INVENTORS
Louis Borins,
BY Maurice H. Slud &
Maurice J. Zubkoff,
ATTORNEY.

United States Patent Office 2,936,708
Patented May 17, 1960

2,936,708

DETONATIVE ELEMENT OF APPARATUS FOR SINKING WELLS BY MEANS OF EXPLOSIVE CHARGES

Louis Borins, Buffalo, and Maurice J. Zubkoff, Tonawanda, N.Y., and Maurice H. Slud, Levittown, Pa., assignors to Randel Tool Company, Inc., Buffalo, N.Y., a corporation of New York Original application February 21, 1957, Serial No. 638,749, now Patent No. 2,898,085, dated August 4, 1959. Divided and this application May 19, 1958, Serial No. 736,178

8 Claims. (Cl. 102—24)

This application is a division of our application Serial No. 638,749 upon which Patent No. 2,898,085 was issued on August 4, 1959, this patent being directed to Apparatus for Sinking Wells by Means of Explosive Charges. The method of sinking wells which is practiced by the apparatus of the parent application forms the subject of Patent No. 2,897,756 which was issued on August 4, 1959 pursuant to a divisional application, Serial No. 647,716. The apparatus and method utilize shaped charges of novel and advantageous character, blasting charges, and carriers severally for the shaped charges and blasting charges, each carrier being composed of frangible material that is shattered by the detonation of its associated charge and being also of novel and advantageous character.

This invention relates to the detonative element of apparatus for sinking wells by means of explosive charges, the element being characterized by the novel carriers for the charges as articles of manufacture, the shaped charges of novel form as articles of manufacture, and the novel combination of the carrier and the explosive charges, including both the shaped charges and blasting charges.

In order that the utility and advantages of the invention may clearly appear the invention is necessarily disclosed in connection with the apparatus and method which forms the subjects of said Patents Nos. 2,898,085 and 2,897,756.

The method, which forms the subject of said Patent No. 2,897,756, in a single cycle of operation utilizes a plurality of shaped charges which are included in the subject of the present application and are mounted in frangible charge carriers which are shattered by the detonation. The shaped charges are sequentially detonated, each having a multiplicity of directionalizing recesses, preferably uniformly distributed, the method being available for advancing the well bore from the surface and including the use of blasting charges also mounted in generally similar frangible charge carriers and arranged in relation to the shaped charges as parts of a series of explosive charges, the blasting charges being detonated in sequential relation to the shaped charges. The method also includes provisions during the period of the detonations for flushing from the well bore the detritus resultant from the detonations. The frangible charge carriers, both for the shaped charges and for the blasting charges, are likewise included in the subject of the present application.

The invention which forms the subject of the present application includes a unitary explosive charge carrier for use with the apparatus shown in said Patent No. 2,898,085. According to the invention the carrier is composed of suitable frangible material, preferably dielectric and preferably molded from a thermosetting plastic such as rubber or a phenol condensation product, which is shattered, i.e., pulverized, by the detonation. The carrier is fashioned to support the charge and to protect it against water, to cooperate with means by which its movement from the magazine is normally arrested, to cooperate with releasable holding devices which form parts of the charge transfer means, and to enable the flow of flushing water. For use with shaped charges the carrier is also fashioned to position the charge in proper stand-off relation to the target. In the case of blasting charges the charge may be supported by the carrier for deposit closely adjacent or in substantially adjoining relation to the target. The carriers are preferably constructed whereby they may be arranged in nested relation in the magazine.

Each charge carrier is of generally annular form and the part which projects above the explosive charge is utilized for its support in the magazine and in the charge transfer means. Each carrier for a shaped charge includes a charge-supporting web located at an intermediate elevation and which also protects the charge against water, either as used for flushing or as encountered in the well sinking operation. Each carrier for a blasting charge preferably includes a similar web located at or near its lower end. In the case of shaped charges each carrier is formed with an annular skirt which projects for a suitable distance below the web and rests upon the target, thereby to position the charge in the appropriate stand-off relation to the target. Each carrier includes an annular vertical wall which in the construction preferred is of externally tapering outline and is otherwise formed to receive in nesting relation the lower portion of the carrier immediately above.

The invention also includes a shaped charge of novel and advantageous construction which is of wafer-like form and is characterized by a multiplicity of uniformly distributed downwardly facing directionalizing recesses which simultaneously generate penetrating jets. The term "shaped charge" is intended to cover both an integral body of suitable explosive material and a series of small bodies of such material, each having an individual directionalizing recess, the small bodies being embedded in a supporting frame of plastic material mounted on the shelf of the carrier and being separated from one another by webs of the plastic material of the frame. The shaped charges may be said to be wafer-like in that in thickness they are quite shallow as compared with shaped charges heretofore known for well sinking or well shooting and the area through which the directionalizing recesses are distributed is many times in excess of the thickness of the charge. The penetrating jets resultant from the detonation of a charge shatter the hard rock uniformly for a distance, according to the predetermined strength of the charge, of the order of from two to six inches and advance the well bore in cylindrical outline through such distance. It is preferred, and in accordance with the invention, that the recesses adjacent the periphery of the charge have their axes at a very slight outward and downward inclination, e.g., of the order of one or two degrees in order to insure that the diametrical dimension of the well bore shall be ample for the free movement of the apparatus. Beyond the distance of effective penetration there will be a series of tapering openings whereby the bottom of the well bore will present a series of ridges which are obliterated by the succeeding detonation, either of a shaped charge or a blasting charge. The size and weight of the shaped charges are determined in accordance with the particular local conditions that may be encountered. Generally speaking, the diametrical dimension is of the order of five and one-half inches and the thickness or depth is within a range of the order of from one-half inch to somewhat more than two inches. An integral shaped charge of one-half inch depth has a weight of the order of one-half pound and the maximum weight for charges of greater depth, with allowance for the increase in the dimensions of the directionalizing recesses, is of the order of one pound.

The blasting charges are in the form of an integral body of explosive material and, according to local conditions, have a depth within a range of the order of one-half inch to one inch and a weight within a range of the order of one-half pound to one pound.

When the stratum of oil bearing sands is reached it may be of economic advantage, depending upon local conditions, to increase the diameter of the well bore. For this purpose shaped charges are used having peripheral directionalizing recesses with their axes directed laterally in addition to the multiplicity of directionalizing recesses open to the lower face of the charge with the result that upon detonation the well bore is both deepened and widened. With shaped charges having a diametrical dimension of the order of five and one-half inches the well bore within the cap-rock and the overlying "earth" will have a diameter somewhat in excess of six inches. The increase of the diameter in the oil bearing stratum may be in excess of twice the diameter of the well bore in the overlying mass.

The shaped charges, preferably, but not necessarily, of any suitable high brisance material, are detonated, in accordance with known practice, by an initiating charge activated by the ignition (from electrical sources) of an explosive fuse such as primacord, the initiating charge as associated with a shaped charge of integral character being preferably of disc outline and arranged within the fuse in adhering relation to the explosive charge. Each explosive charge is detonated by a delay type igniter following its deposit upon the target and during the return movement of the charge transfer means.

The charges (shaped and blasting) used in the normal sinking of the well bore may be preformed independently of the carriers and, being malleable under heat, thereafter fitted in the carriers. However the preferred practice is to incorporate them with the carriers during the molding operation. The recesses of the shaped charges are preferably formed by metal or other liners of corresponding shape which, at the inception of the molding operation, are supported in accordance with established plastic molding technique by temporary rods resting upon the base of the mold. The shaped charges used for sinking and expanding the well bore in the oil bearing stratum are preformed and thereafter fitted in the recesses of the carriers.

In the drawings:

Figures 1 to 1d inclusive are schematic views illustrating the successive steps of operation involved in the detonation of an initial shaped charge when hard impervious rock stratum is encountered.

Figure 1 is an elevation, partly in section, which assumes the formation of the well bore to the point where hard impervious rock stratum is encountered and shows the apparatus at the time of the initial contact of the charge transfer means, then empty, with the target, i.e., the hard rock stratum.

Figure 1a is a fragmentary elevation, partly in section, which shows the apparatus with the shell in the position shown in Figure 1 but with the charge transfer means, immediately following its initial contact with the target, in its uppermost position in which it has received the lowermost charge carrier from the magazine.

Figure 1b is a similar fragmentary elevation, partly in section, which shows the apparatus with the shell in the position shown in Figure 1 but with the charge transfer means, bearing a charge carrier, in its lowermost position in which the charge carrier is deposited upon the hard rock stratum for detonation of the charge.

Figure 1c is a similar fragmentary elevation, partly in section, which shows the apparatus with the shell in the position shown in Figure 1 at the time when the charge transfer means, having deposited the charge carrier upon the target for detonation of the charge, is in movement to its uppermost position to receive a succeeding charge carrier from the magazine, the deposited charge carrier being shown resting upon the target.

Figure 1d is a similar fragmentary elevation, partly in section, which shows the apparatus with the shell in the position shown in Figure 1 but with the charge transfer means in its uppermost position and as having received a succeeding charge carrier from the magazine, this figure assuming the detonation of the preceding charge and showing the resultant extension of the well bore into the hard rock stratum.

Figure 2 is a fragmentary elevation, partly in section, which assumes the detonation of a preceding charge and the downward movement of the apparatus for a distance corresponding to the resultant extension of the well bore with the shell and the charge transfer means in the same relation to one another and to the hard rock stratum which is shown in Figure 1b, it being understood that the immediately succeeding steps of operation are in accordance with the showing of Figures 1c and 1d.

Figures 3 and 4, considered conjointly, show the apparatus in vertical central section, Figure 3 showing the upper portion of the apparatus and Figure 4 it lower portion with the explosive charge transfer means in its raised position relatively to the shell.

Figure 5 is a partial vertical central section of the apparatus with the explosive charge transfer means in its lower position relatively to the shell.

Figure 6 is a horizontal section on the line 6—6 of Figure 3 with a cover plate partly broken away to expose to view certain underlying parts.

Figure 7 is a horizontal section on the line 7—7 of Figure 3.

Figure 8 is a horizontal section on the line 8—8 of Figure 3.

Figure 9 is a horizontal section on the line 9—9 of Figure 4.

Figure 10 is a horizontal section on the line 10—10 of Figure 4.

Figure 11 is a horizontal section on the line 11—11 of Figure 4.

Figure 12 is a horizontal section on the line 12—12 of Figure 4.

Figure 13:
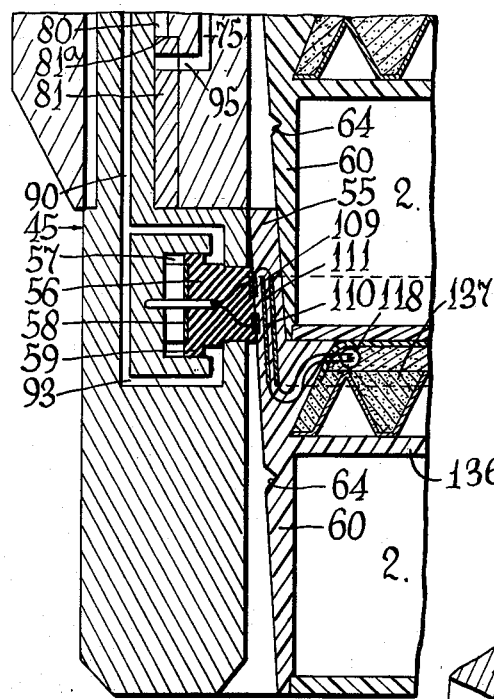

Figure 13 is a partial vertical diametrical section on an enlarged scale of the shaped charge carrier and the shaped charge, together with the lower portion of the charge transfer means.

Figure 14:
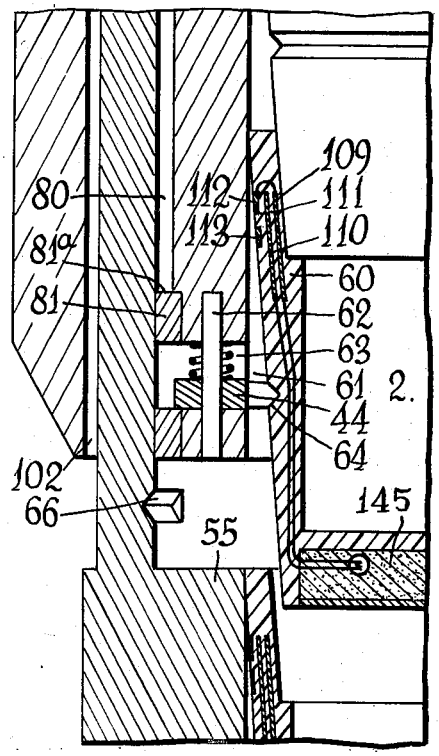

Figure 14 is a similar view in which the carrier is formed for the support of a blasting charge, the plane of the section being sixty degrees distant from the plane of the section shown in Figure 13.

Figure 15 is a perspective sectional view of one of a plurality of similar valves by which air as the operating fluid is admitted into the pressure way above the charge transfer means.

Figure 16 is an enlarged fragmentary vertical sectional view in the same plane as Figure 5 showing in closed position certain spring biased valves associated with air flow passages.

Figure 17 is a view similar to Figure 16 but showing the same valves in their open or by-passing positions.

Figure 18 is a fragmentary horizontal view in the same plane as Figure 11 and showing in its releasing position one of a plurality of detents associated with the magazine and which normally engage the lowermost charge carrier as the support for the series of charge carriers.

Figure 19 is a fragmentary sectional perspective view with the upper and intermediate shell sections in separated relation and showing more particularly their companion connecting elements and the electrical contacts at the lower end of the upper shell section and the upper end of the intermediate shell section.

Figure 20:
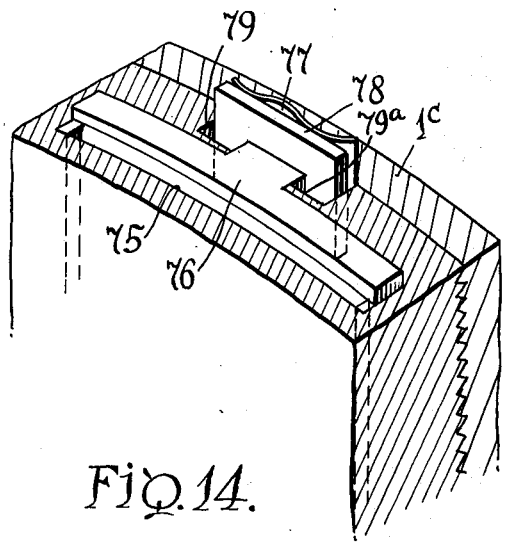

Figure 20 is a detail perspective view, partly in section, on an enlarged scale, of one of a plurality of valves shown in Figures 4, 5 and 9 for controlling the flow of air through certain passages, the valve in this figure being in its open position which is shown in Figure 5.

Figure 21 is a fragmentary horizontal sectional view on the line 21—21 of Figure 16 showing one of a plurality of similar air by-passing valves used in the venting operation.

Figure 22:
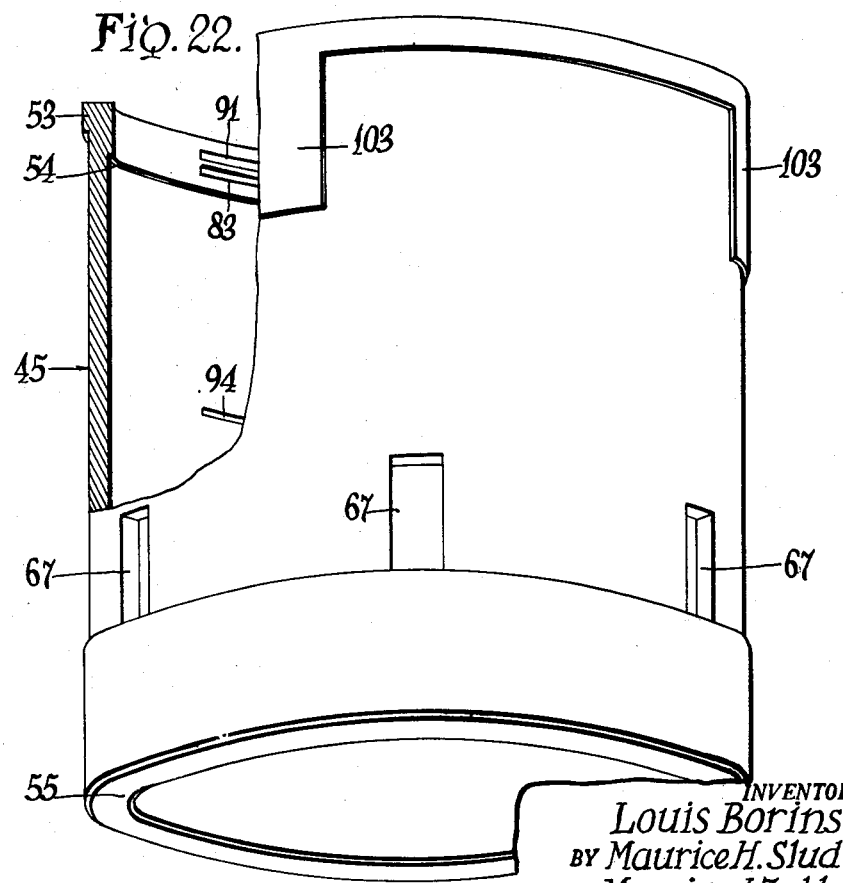

Figure 22 is a detail perspective view of the charge transfer means.

Figure 23:
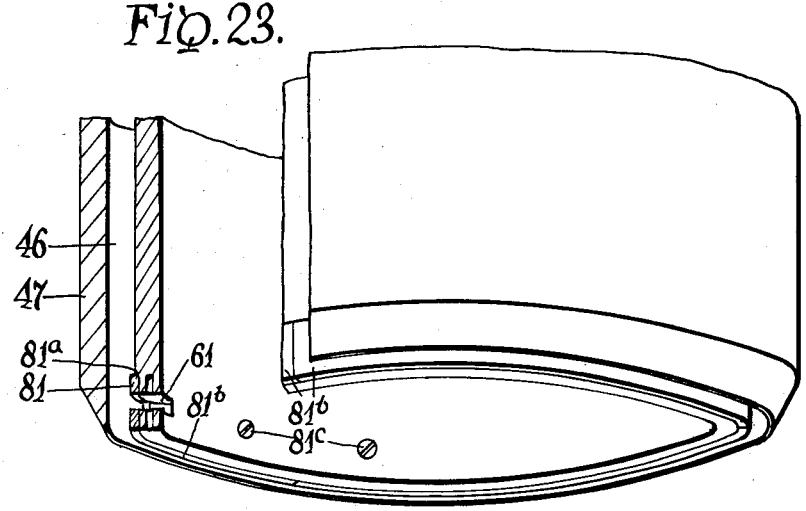

Figure 23 is a detail fragmentary perspective view partly broken away and showing the relationship between the lower portion of the shell and of the sleeve in surrounding relation to the shell and which delimits an annular way external of the shell in which the charge transfer carrier is movable.

Figure 24 is a wiring diagram showing the detonating circuit as conditioned to effect the detonation.

Figure 25 is a developed vertical section showing electrical cable sections in the several shell sections and the charge transfer means and also showing the electrical connections between the wires.

Figure 26 is a vertical section in a plane radially intersecting the section shown in Figure 25.

Figure 27 is a central transverse section of an embodiment of the invention comprising a shaped charge and its carrier, this figure assuming that the charge is an integral body of explosive material and that the directionalizing feature consists of conical recesses.

Figure 28 is a central transverse section of an embodiment of the invention for use in association with the embodiment shown in Figure 27 and comprising a blasting charge and its carrier.

Figure 29 is a partial bottom plan view of the shaped charge shown in Figure 27.

Figure 30 is a partial plan view of a shaped charge consisting of an integral body of explosive material wherein the directionalizing feature consists of concentric grooves of inverted V-shape in section.

Figure 31 is a partial transverse sectional view on the line 31—31 of Figure 30.

Figure 32 is a bottom plan view of a shaped charge consisting of an integral body of explosive material wherein the directionalizing feature consists of radially arranged grooves of inverted V-shape in section.

Figure 33 is a partial transverse section on the line 33—33 of Figure 32.

Figure 34 is a partial central transverse section of a shaped charge which is formed to enlarge the well bore in the stratum of oil bearing sands, the showing of the shaped charge in this figure being applicable either to conical recesses or annular grooves as the directionalizing feature.

Figure 35 is a partial side elevation of a shaped charge formed to enlarge the well bore in the stratum of oil bearing sands and wherein the directionalizing feature for sinking the well bore vertically consists of the radial grooves shown in Figures 32 and 33.

Figure 36 is a plan view of a shaped charge which shows more particularly the form of the explosive fuse and its relation to the initiating charge and the electrically actuated delay type igniter.

Figure 37:
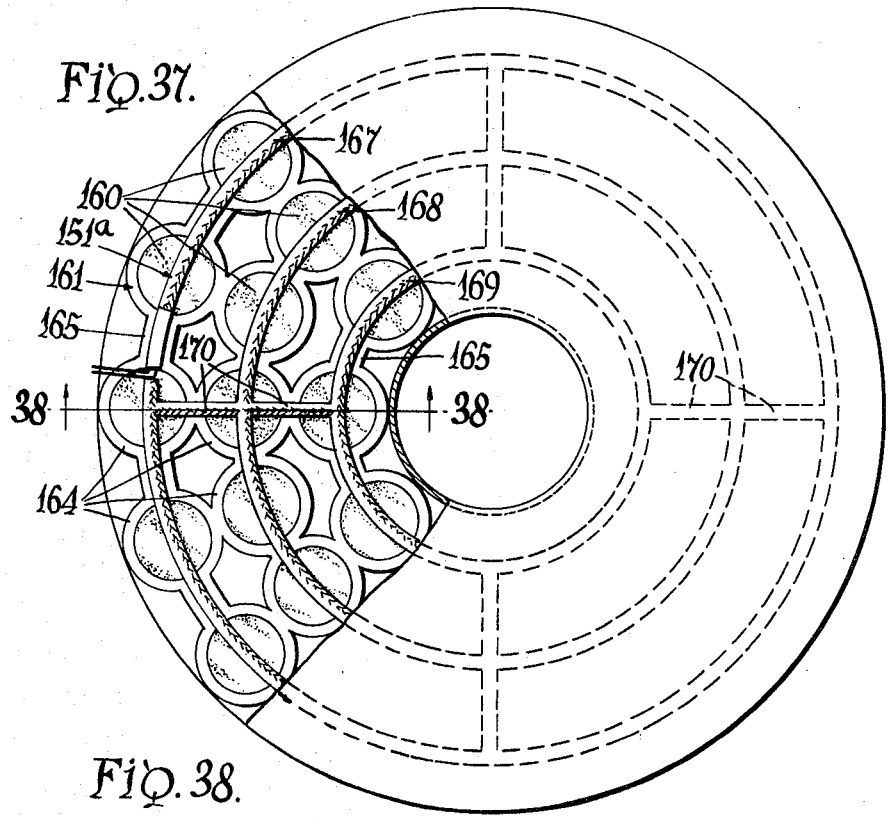

Figure 37 is a plan view, with the cover partly broken away, of a shaped charge composed of a series of small bodies of explosive material embedded in a plastic frame and each having an individual directionalizing recess.

Figure 38:
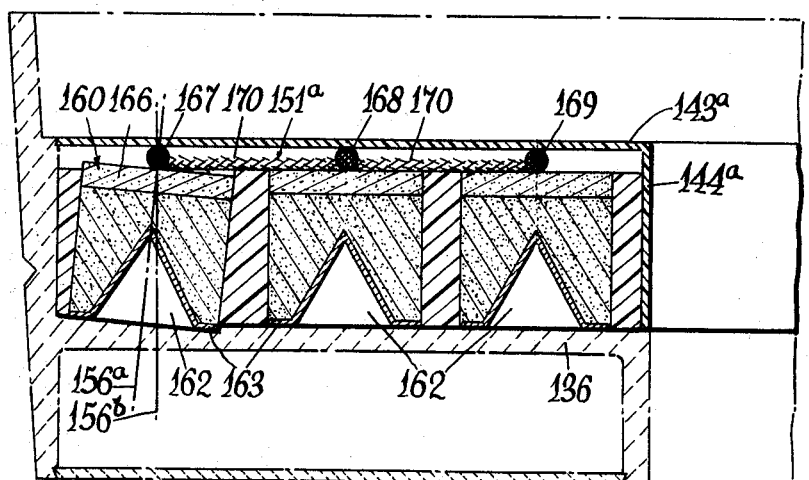

Figure 38 is a sectional view on an enlarged scale on the line 38—38 of Figure 37, this figure also showing by broken lines the mounting of the charge in the charge carrier.

The operating unit of the apparatus includes a shell 1 of cylindrical form which carries sundry associated parts and provides a magazine for the explosive charge carriers 2 (Figures 3, 4 and 5) which form the subject of the present application, these being arranged in superposed relation and provided in a predetermined number. The shell is preferably composed of upper, intermediate and lower cylindrical sections (Figure 1) 1a, 1b and 1c, respectively, connected in abutting relation by any suitable quick releasable devices, e.g., the bayonet lugs 3 at the lower ends of the sections 1a and 1b and the companion slots 4 at the upper ends of the sections 1b and 1c. The upper section 1a carries a distributor and the lower section 1c is associated with the charge transfer means, both to be later described in detail. The sections 1b and 1c conjointly provide the magazine, and the sections 1b are made of varying lengths from which a selection may be made in order that the magazine capacity may be in accordance with prevailing conditions.

The shell 1 (Figure 3) is detachably connected at its upper end to a top plate 5 and is raised and lowered by means of cables 6 having terminal loops 7 threaded through eye members 8 bolted as at 9 to the top plate 5. The movable parts of the operating unit are power actuated, preferably by compressed air conveyed from an external source by a flexible hose 10 having a suitable connection 11 externally of the unit to a pipe section 12 which extends into the unit through the plate 5. The flushing of the rock detritus is preferably effected by a flushing fluid of any suitable character which for brevity and convenience is herein referred to as "water." The water is pumped under suitable pressure from a source at the surface and is conveyed by a flexible hose 13 having a suitable connection 14 externally of the unit to a pipe section 15 which extends into the unit through the plate 5. The cable 16 for the electric wires of the circuit by which the squib is ignited extends into the unit through the top plate 5. The section 1a carries in detachable relation a distributor 17 for the air conveyed by the hose 10 and the water conveyed by the hose 13.

The distributor 17, in the form of a cylindrical block, is formed with a vertical passage 18 which may be called a supply passage for the operating fluid. The passage 18 is in open communication at its upper end with the pipe section 12 and at its lower end with a horizontal continuation 19 which extends radially to, and communicates with, an opening 37 located centrally of the distributor 17. The opening 37, as will be later described in detail, forms part of a flow passage from which air under pressure is delivered into the pressure space P at the upper end of the magazine M in which the explosive charges are arranged. The opening 37 is also utilized as a manifold for the distribution of air via radial passages (Figure 7) 20a, 20b, 20c, 20d and 20e to a number of vertical air flow passages formed in the wall of the shell and which will be described in detail at a later point. A passage 21 of similar function extends radially outward from the passage 18 and communicates with one of the vertical air flow passages in the shell. The distributor 17 (Figure 3) has a recess in its upper face which provides a water inlet chamber 22 closed by a cover plate 23 fitted in a countersunk recess and secured in any suitable manner, as by spot welding. The pipe section 15 is connected to the cover plate 23 and is normally in open communication wtih the chamber 22.

The cables 6 in their functions of raising, lowering and supporting the operating unit are controlled by a suitable windlass (not shown) located at the surface. The air hose 10, water hose 13 and electric cable 16 are severally mounted on suitable reels (not shown) located at the surface. Since the air hose 10, water hose 13 and cable 16 differ in diameter from one another and from the cables 6 any suitable provision is made in accordance with known engineering practice for co-ordinating the rate of rotation of their reels to the rate of rotation of the windlass for the cables 6 whereby these several flexible elements will have the same rate of upward and downward movement.

The water inlet chamber 22 discharges through a series of passages 24 in the distributor 17 into a vertical flush pipe 25 detachably connected to the distributor 17 from which it extends for the remaining length of the unit, the pipe 25 being open at its lower end and of any suitable diameter, e.g., the same diameter as the hose 13 and pipe section 15. The water is pumped under suitable pressure through the hose 13 and pipe section 15 and, discharging from the pipe 25, flows into the lower end of the well bore W whence, carrying with it in suspension the fragmented and pulverized rock detritus, it flows upward to the surface through the space S between the well bore and the unit, being conveyed at the surface to a disposal basin (not shown).

The gallonage of water required per unit of time for the flushing operation will, of course, vary with different operating conditions including the depth at which the unit may be working. The amount of water required or proper for a particular operating condition is determined by a suitable flow regulating valve. As shown, and now considered preferred, the water flow regulating valve (Figures 3 and 6) consists of a plate 26 of disc form mounted for turning movement about its axial center upon the base of the inlet chamber 22 and having openings 27 for total or partial registry with the upper ends of the passages 24, the amount of water delivered to the pipe 25 being proportionate to the degree of registry. The positional adjustment of the valve 26 is made in accordance with prevailing conditions, at any position of the unit in the well bore, preferably by an electric motor 28 mounted upon the cover plate 23. The regulation of the flow of flushing water through the pipe 25 by the adjustment of the position of the valve 26 as incorporated with the unit results in the rate of flow of flushing water through the pipe 25 being determined independently of friction losses in the water supply hose 13. The shaft 29 of the motor 28 extends into the water inlet chamber 22 and is journalled at its lower end in the distributor 17, the shaft carrying a spur gear 30 adjacent the base of the chamber 22. The plate 26 is formed with a series of peripheral teeth 31 (Figure 6) in mesh with the spur gear 30. The position of the plate 26 is indicated to the operator at the surface by a dial mechanism (not shown) in electrical association with the motor 28, the form of the dial mechanism and the manner of its electrical association with the motor being well known for use where the positional adjustment of a concealed part is to be indicated to the operator in charge. The dial mechanism, of course, informs the operator of the prevailing adjustment of the position of the plate 26 and enables him to determine the direction and extent of its movement when a change may be required in the gallonage of water flowing through the pipe 25.

In the event that a back pressure should be encountered sufficiently high to cause resurgence of the water in the pipe section 15 and hose 13, or otherwise to put an undue load on the pump, it is desirable that the flow of water be cut off until the condition is relieved. For this purpose a check valve 32 (Figure 3) is located in alining relation below the lower end of the pipe section 15 and urged upward by a loading spring 33, Figure 3 assuming the valve 32 to be held open by the pressure of the water discharging from the pipe section 15. The valve 32 has a central depending stem 34 which provides a pivot about which the valve 26 may be turned and, projecting through a central opening in the valve, is fitted loosely in a recess in the distributor 17. The pressure of the spring 33 may be relied upon to hold the valve 26 in seated relation upon the base of the recess 22.

The shell parts 1b and 1c conjointly provide the magazine M for the explosive charge carriers 2, these having central openings 35 which accommodate the pipe 25 and aline with other accommodating openings in parts associated with the charge carriers as will be later described in detail. The shell parts 1b are made of varying lengths to enable the selection of the particular magazine capacity which will accord with prevailing conditions. It is preferred that the charge carriers as a series be at all times under pushing pressure. The pressure medium is preferably compressed air delivered from the passage 19 into the upper portion of the magazine and acting upon a horizontal follower or pusher plate 36 slidably mounted in the magazine and having a direct bearing upon the uppermost carrier of the series. The air flow passages for the delivery of air into the magazine includes the opening 37 in the distributor 17 of suitably greater diameter than the pipe 25 and which communicates with and extends downward from the passages 19 and 20a, 20b, 20c, 20d and 20e. The wall of the opening 37 is formed with an annular rabbetted recess extending to the underface of the distributor 17 in which is fitted the upper end of a pipe 38 arranged in spaced concentric relation to the pipe 25 and also accommodated in the openings 35 and the associated alining openings. The pipes 38 and 25 delimit an annular air flow passage 39, the upper end of which is constituted by the annular wall of the opening 37. The pipe 38 extends from the distributor 17 preferably for the remaining length of the unit and the air passage 39 is closed at its lower end by a ring 40 (Figure 5) interposed between the pipes 38 and 25 and also serving to brace these pipes to one another.

The pipe 38 has in its upper portion a series of openings 41 through which the air flows from the passage 39 into the pressure space P of the magazine. The follower 36 has a central opening in surrounding relation to the pipe 38 and is preferably formed at the perimeter of this opening and at its periphery with raised flanges 42 and 43 which are respectively in suitable contact with the pipe 38 and the inner wall of the shell 1 and serve both as guides for the follower 36 and also to prevent undue loss of air from the pressure space P.

The explosive charge carriers 2 are supported by a series of movable detents 44 (Figures 5, 11, 14 and 18) provided at the lower end of the shell 1 and normally engaging the lowermost carrier 2 in the magazine, the detents 44 being operated to disengage the lowermost carrier at the time when it is to be released from the magazine and deposited in the charge transfer means. Immediately after the release of the lowermost carrier the detents 44 are returned to their normal positions in readiness to engage the immediately succeeding carrier which then becomes the lowermost carrier of the series. The discharge of each lowermost carrier from the magazine and the movements of the series of carriers in step-by-step fashion upon such discharges are effected by the downward movement of the follower 36 under the pressure of air in the magazine space above.

When the last charge of the series has been detonated the unit is brought to the surface for reloading (the air and water supply of course being cut off at the time) and the shell sections separated. If the number of charges required for the succeeding cycle remains unchanged a new series or "clip" of charges may be placed in the section 1b with the follower plate 36 resting upon the uppermost charge and when the sections 1b and 1c are connected the clip will drop until the lowermost charge is engaged by the detents 44; or, as a time saving measure, a duplicate section 1b containing the same number of charges (held against displacement by removable tapes) may be substituted. If the number of charges required for the succeeding cycle should vary from the number required for the preceding cycle a section 1b of greater or less length containing the determined number of charges is substituted. Thereupon the three sections are again connected and the unit is lowered into the well bore for a repetition of the cycle of operations. The length of the pipe 25 of course accords with the length of the shell.

If a magazine of greater capacity than that of a single section 1b of maximum capacity be desired two or more sections 1b may be connected together as a string, the follower plate 36 being of course arranged in the uppermost section 1b.

The charge transfer means 45 (Figures 4 and 5) is in the form of a cylinder having piston-like movement in an annular vertical way 46 at the lower end of the shell 1. The way 46 is open at its lower end and is delimited by the shell and a spaced concentric sleeve 47 secured to the shell in any suitable manner. As shown the sleeve has an upward extension 48 of reduced internal diameter which adjoins the outer face of the shell and provides an internal annular shoulder 49, the sleeve having internal threads immediately below the shoulder 49. The shell 1 is provided at a suitable elevation with a circumscribing flange 50 against which the shoulder 49 abuts when the sleeve is properly positioned, the flange 50 having threads for engagement by the threads of the sleeve. A ring 51 is attached to the shell immediately below the flange 50 and is formed to provide housings for upwardly biased check valves 52 to be later described in detail, the lower face of the ring 51 constituting the upper face of the way 46.

The charge transfer cylinder 45 has at its upper end an annular head 53 which corresponds in thickness to the width of the way 46 and provides a piston responsive in downward movement to air under pressure admitted into the upper end of the way through the valves 52 and in upward movement to air under pressure admitted through certain air passages to be later described and reacting against an internal annular shoulder 54.

The cylinder 45 has at its lower end an inwardly projecting annular flange 55 which is preferably of the same vertical extent as the explosive charge carriers and receives the lowermost charge carrier from the magazine. Each charge carrier, as supported within the flange 55, is deposited upon the bottom of the well bore at the completion of the downward movement of the cylinder 45. The downward movement of the cylinder 45 is positively limited by means later to be described in detail.

The charge carriers are supported within the flange 55 by a suitable number, e.g., three, of clamping dogs 56 (Figures 5 and 13) mounted for radial movement in recesses 57 open to the inner face of the flange 55. The dogs 56 are normally biased inward by springs 58 reacting against the bases of the recesses 57 and thereby have engaging and clamping contact with the vertical walls of the charge carriers 2. At their inner ends the dogs 56 have circumscribing flanges 59 to which air under pressure is delivered when the cylinder 45 reaches its lowermost position, the dogs 56 thereby being retracted and releasing the charge carrier for support upon the bottom of the well bore. When the charge carrier is thus released the cylinder 45 moves upward to the position in which it receives the succeeding charge carrier from the magazine. The charge carriers 2 have a vertical annular wall 60 (Figures 13 and 14), the external face of which preferably has a slight downward taper and the dogs 56 have their engaging faces at an incline which conforms to the taper.

The detents 44 are arranged in recesses 61 extending between the inner and outer faces of the shell 1 and are mounted on vertical pivot pins 62. The detents have an operative position in which they project slightly beyond the inner face of the shell and an inoperative or retracted position in which their leading edges are within the recesses 61. The detents are formed with tail pieces 65 of V-shaped cross section for engagement by the inner face of the charge transfer cylinder 45 which is thereby utilized to hold the detents in their operative positions. The retractile movement of the detents is effected by torsion springs 63 mounted on the pivots 62. The wall 60 of a charge carrier 2 is formed on its outer face with an annular groove 64 (Figures 4, 13 and 14) and the detents 44 engage in the groove 64 of the lowermost charge carrier, thereby to support the series of charge carriers in the magazine. The charge transfer cylinder 45 is formed on its inner face a short distance above the flange 55 with peripherally alining recesses 66 of V-shaped section. When the charge transfer cylinder is in its upper position the recesses 66 accommodate the tail pieces 65 and thereby enable the retraction of the detents by the springs 63. When the detents are retracted the lowermost charge carrier is moved from the magazine under the pressure of the follower 36 to a position within the flange 55 and is supported within the flange by the dogs 56, the succeeding charge carrier thereupon becoming the lowermost.

The annular wall 60 of a charge carrier 2 is shaped externally and internally to enable the carriers to be arranged in nested relation in the magazine. When the charge transfer cylinder 45 commences its downward movement the upper walls of its recesses 66 engage the tail pieces 65 as cams and move the detents 44 to their projected or operative positions in which they engage in the grooves 64 of the succeeding charge carrier, now the lowermost carrier in the series, the projected positions of the detents being maintained by the engagement of the inner face of the charge transfer cylinder 45 against the tail pieces. As above noted when the charge transfer cylinder reaches its lowermost position the dogs 56 are retracted by air pressure directed against their flanges 59 whereupon the charge carrier within the flange 55 is released and deposited upon the bottom of the well bore.

The lower end of the flush pipe 25 is preferably in the same plane as the lower end of the shell 1. When the charge transfer cylinder 45 is in its uppermost position water from the pipe 25 discharges directly into the well bore through the central opening 35 of the lowermost charge carrier as deposited within the flange 55. Immediately above the flange 55 the cylinder 45 is formed with openings 67 (Figure 5) extending between its inner and outer faces. During the downward movement of the cylinder 45 the openings 67 are exposed and the water from the pipe 25 flows through the openings 67 into the lower end of the space S through which it rises, flushing to the surface the rock detritus and the fragments of the charge carrier left from the previous detonation.

The flow of air for effecting the reciprocatory movement of the charge transfer cylinder 45, the releasing movement of the clamping dogs 56, and the venting of the operating air to environment is prescribed by various passages to be later described in detail. Certain of these, together with their associated valves, are equidistantly spaced in a number, e.g., three, such that the charge transfer cylinder 45 will be completely balanced in its movements. The cylinder 45, as will be later described in detail, is itself utilized as a valve in relation to certain of the air flow passages.

The distributor passages 20b, 20d and 21 extend to vertical air passages 68 (Figures 3 and 7) having alining components in the several shell sections and being parts of the air flow paths for the admission of air to the upper end of the way 46, the air so admitted acting upon the annular head 53 of the charge transfer cylinder 45, thereby to effect its downward movement. In the section 1c the passages 68 communicate with short radial passages 69 (Figure 4) in the lower face of the flange 50. The direct flow of air into the upper end of the way 46 is from the passages 69 through alining upper and lower passages 70 and 71 (Figures 4 and 15) in the ring 51. The passages 70 are formed at their lower ends with tapering seats 72 for the check valves 52 which are of conformably tapering cross section with flattened upper ends alining with the passages 70. Below the seats 72 the pasages 70 communicate with the passages 71 which are enlarged diametrically and in open commucation with the upper end of the way 46. The valves 52 are biased upward by springs 73 acting with a pressure at all times suitably below the constant line pressure, i.e., the pressure of air admitted into the passages 63. During the upward stroke of the charge transfer cylinder 45 the valves 52 are held closed until a point is reached near the end of the stroke at which, in a manner later to be described, the air under pressure in the unit, that is to say the air under pressure in the way 46 and the air under line pressure which effects the upward stroke, is vented to environment, the cylinder reaching the end of its upward stroke (as determined by the engagement of the flange 55 against the lower end of the shell) by the momentum of its movement. Upon the venting of the air from the way 46 the pressure of air above the head 53 is slightly in excess of atmospheric pressure with the result that the valves 52 are opened whereupon the air under the line pressure flows through the passages 70, past the valves 52 and through the passages 71 into the upper end of the way 46, effecting the downward movement of the charge transfer cylinder. The total pressure acting upon the valves 52 to close them is the sum of the pressure of air in the way 46 (which by reason of the springs 73 is at all times substantially below the line pressure) and the pressure of the springs 73. When this sum equals the line pressure the valves 52 are closed. Such closing of the valves 52 is effected momentarily before the completion of the downward movement of the cylinder 45. With the valves 52 closed the pressure of the air in the way 46 which acts upon the upper face of the head 53 is insufficient to arrest the upward movement of the cylinder 45 under the line pressure directed at the time (in a manner later to be described) against the shoulder 54 of the head 53.

The distributor passages 20a, 20c and 20e extend to vertical air passages 74 (Figures 4 and 7) having alining components in the several shell sections. The section 1c is also formed with vertical air passages 75 which, alining with the passages 74, at periods of the movement of the charge transfer cylinder 45 communicates with them as functional continuations (Figure 5) and at other periods of movement are occluded (Figure 4). The interruption of the communication between the passages 74 and 75 is effected by horizontal plate valves 76 (Figures 4 and 20) having planar movement through openings in the shell section 1c and biased to closed positions by springs 77, the valves 76 having heads 78 movable in recesses 79 in the flange 50 and spaced from the bases of the recesses in the closed positions of the valves.

Below the head 53 the charge transfer cylinder 45 is of reduced thickness and in combination with the shell 1 delimits an annular air passage 80 extending to the shoulder 54, air under line pressure acting upon the shoulder to move the cylinder 45 in its upward stroke. The passage 80 is closed at its lower end by an annular flange 81 (Figures 13 and 14) adjoining the cylinder 45. The flange 81 is provided by a ring fitted in a rabbet 81a at the lower end of the shell 1 and made in sections 81b (Figures 11 and 23) secured to the shell 1 by screws 81c having their heads in countersunk recesses in the inner face of the shell, the recesses 61 being continued through the sections 81b. In assembly the cylinder 45 is inserted part way into the way 46 and the ring sections 81b are successively inserted through the open lower end of the cylinder 45, fitted in the rabbet 81a and secured by the screws 81c. The air passage 80 is vented through passages 82 (Figures 5 and 17) formed in the head 53 and extending from the shoulder 54, the passages 82 having at their upper ends angular extensions 83 open to the inner face of the head 53 and normally closed by spring biased valves 84. The passages 75 communicate with the annular passage 80 through lateral passages 85 in the shell 1.

The sleeve 47 is formed (Figures 4, 16 and 17) with vertical passages 86, each having at its upper and lower ends lateral branches 87 and 88 open to the inner face of the sleeve. The branches 87 communicate with passages 89 in the flange 50 which extend to the recesses 79 at points behind the heads 78 of the valves 76. The branches 88 communicate with the way 46 at points near its lower end. The head 53 in the downward stroke of the cylinder 45, and at a point near the end of such stroke, passes beyond the passages 88 (Figure 5) at which time air flows from the way 46 through the passages 88, 86, 87 and 89 into the recesses 79 and, acting on the heads 78, moves the valves 76 to open positions against the pressure of their springs 77. Thereby the communication of the passages 74 and 75 is established, the air under line pressure then flowing through the passages 75 and 85 into the annular recess 80 and acting on the shoulder 54 to effect the upward (return) movement of the cylinder 45.

The cylinder 45 is formed with vertical air passages 90 (Figures 4 and 5) which extend between the head 53 and the flange 55. In the head 53 the passages 90 have angular extensions 91 (Figures 16, 17 and 21) open to the inner face of the head and normally closed by spring biased valve 92. In the flange 55 the passages 90 communicate with angular passages 93 which extend to the recesses 57 at points behind the flange 59. At intermediate points the passages 90 are in communication with lateral air supply passages 94 open to the inner face of the cylinder 45. The passages 75 have at their lower ends lateral extensions 95. The cylinder 45 is held against turning movement about its axis and its downward movement is positively limited by inwardly projecting pins 96 (Figure 5) carried by the sleeve 47. For holding the cylinder 45 against turning movement the pins 96 are accommodated in vertical grooves 97 in the outer face of the cylinder. For limiting the downward movement of the cylinder 45 the pins 96 are engaged by shoulders 98 at the under side of the head 53 and extending from its outer face. Such engagement positively determines the lowermost position of the cylinder 45. With the cylinder 45 in its lowermost position (Figure 5) the passages 95 register with the passages 94 and air under line pressure flows into the passages 90, the escape of such air from the passages 90 at that time being prevented by the valves 92. The air admitted to the recesses 57 through the passages 93 acts upon the flanges 59 to retract the dogs 56 whereupon the explosive charge carrier is deposited upon the target.

As noted above near the end of the upward stroke of the cylinder 45 the air under pressure in the unit is vented to environment. For this purpose an annular by-passing chamber 99 (Figures 4, 5 and 17) is provided which includes a part of the way 46 and is defined by opposing annular recesses 100 and 101 open to the way 46 and formed respectively in the outer face of the shell 1 and the inner face of the sleeve 47. Below the head 53 the outer face of the cylinder 45 is inwardly offset whereby a vent passage 102 (Figure 5) extending downward from the shoulders 98 is delimited by the cylinder 45 and the sleeve 47, this passage being open to environment at the lower end of the sleeve 47. During that part of the upward movement of the cylinder 45 when its head 53 is below the chamber 99 the valves 84 and 92 are held closed, the passages 83 and 81 being sealed by the outer face of the shell 1. When the head 53 of the cylinder 45 enters the chamber 99 communication is established between the chamber 99 and the vent passage 102 with the result that the valves 84 and 92 are open under line pressure and the air in the passages 80 and 90 as well as the air in the way 46 by-passed to environment via the chamber 99 and the vent passage 102.

The passages 74 and 75 are in communication until the valves 84 and 92 are within the chamber 99, the passages 88 being meantime sealed. Such sealing is effected by pads 103 (Figures 4 and 22) which extend downward from the head 53 into the passage 102 and may be formed integrally with the cylinder 45. When the valves 84 and 92 are within the chamber 99 the pads 103 uncover the passages 88. Thereupon the air in the passages 86 escapes to environment through the passage 102 and the valves 76 are moved to closed positions by their biasing springs 77, shutting off the communication between the passages 74 and 75. As above noted the further upward movement of the cylinder 45, that is to say the movement which carries the valves 84 and 92 beyond the chamber 99, is continued by momentum until it is arrested by the engagement of the flange 55 against the lower end of the shell 1. Owing to the rapidity of the downward stroke of the cylinder 45 the loss of air through the valves 52 during the movement of the head 53 through the chamber 99 is negligible.

The upward movement of the cylinder 45, prior to the passage of the head 53 into the chamber 99, is cushioned by the air in the way 46, a shock absorbing action thereby being effected. When the head 53 passes beyond the chamber 99, at which time the cylinder 45 moves upward by its momentum, an adequate cushioning or shock absorbing action is effected by the air at line pressure which flows past the valves 52 into the upper end of the way 46.

In résumé, the operation of the unit as thus far described is as follows: Assuming that the well bore W has been carried to a point, either by the use of the apparatus of the invention or otherwise, at which a hard impervious rock stratum R, such as cap-rock, is encountered, the unit is loaded at the surface with a clip of explosive charge carriers 2 and the cylinder 45 is moved to its lowermost position at which time the line pressure is cut off by a valve (not shown). The unit is then lowered into the well bore until the flange 55 makes contact with the rock stratum R (Figure 1), the slack of the cables at such time being taken up. The air supply line is then opened and the cylinder 45 moves to its upper position (Figure 1a) in which it receives within its flange 55 the lowermost charge carrier 2, such charge carrier bearing a shaped charge. Immediately thereupon the cylinder 45 moves in its downward stroke at the completion of which (Figure 1b) the dogs 56 are retracted to release the charge carrier 2 and deposit it upon the cap-rock. The cylinder 45 then returns to its upper position (Figure 1c), the shaped charge meantime being detonated to advance the well bore into the rock stratum R. At the completion of its upper or return stroke the cylinder 45 receives in its flange 55 the succeeding charge carrier 2 (Figure 1d) and during the downward stroke of the cylinder 45, if the charge be a shaped charge, the unit is lowered into the well bore for a distance substantially equal to the advancement of the well bore into the rock stratum R by the previous detonation (Figure 2), the air supply being regulated properly to time the downward stroke of the cylinder and deposit of the explosive charge carrier upon the target. When the charges delivered to the flange 55 are blasting charges the unit is held stationary during the downward stroke of the cylinder 45. The sequence of operations represented by Figures 1c, 1d and 2 is repeated until the magazine has been exhausted at which time the unit is withdrawn to the surface for reloading and the next cycle of operations is inaugurated commencing with the above described step shown in Figure 1. During a cycle of operation (which involves the successive detonation of the explosive charges loaded into the magazine) the well bore is periodically or continuously flushed by the water flowing through the pipe 25.

Certain physical items of the electric wiring for the circuits which control the detonation of the charge will be described in sufficient detail at a later point. These circuits utilize the clamping dogs 56 which are preferably composed of dielectric material, e.g., a thermosetting plastic such as a phenol condensation product. The circuits are shown in the wiring diagram of Figure 24 and include the wires 104 and 105 from the current source and their respective terminal contacts 106 and 107, these being carried by one of the clamping dogs 56 and being substantially flush with the engaging face of the dog, the flow of current from the source being controlled by a switch 108 interposed in the wire 104. As above explained the detonation occurs after the charge carrier 2 has been deposited upon the target and at a time when the cylinder 45 is near the end of its upward stroke. The detonation is the result of the breaking of the circuit which includes the wires 104 and 105, this circuit being utilized to impose potential upon condenser elements 109 and 110 embedded in the vertical wall 60 of each charge carrier 2. These elements may be of any suitable character and are shown schematically as plates which, of course, are of arcuate outline, the charge carrier as made of dielectric material providing the dielectric 111 between the plates. When the charge carrier is supported within the flange 55 the contacts 106 and 107 engage contacts 112 and 113 respectively, these being connected by wires 114 and 115 to the respective condenser elements 109 and 110. The contacts 112 and 113 are flush with the outer face of the charge carrier and are preferably of annular form. The plates 109 and 110 are connected respectively by wires 116 and 117 to a delay type igniter 118. The charging circuit of the condenser is closed during the downward movement of the charge transfer cylinder 45. The retraction of the clamping dogs 56 disengages the contacts 106 and 107 from their companion contacts 112 and 113, thereby breaking the charging circuit. The discharge of the condenser is through the wires 116 and 117 and the interposed delay type igniter 118. The explosion of the charge (shaped charge or blasting charge) occurs near the end of the return stroke of the cylinder 45, the delay feature of the igniter 118 providing the time element required for such movement of the cylinder. The purpose of such delay is to minimize to a harmless degree the reactive shock and recoil forces, the cushion of air in the way 46 at the same time providing a shock absorbing feature.

The circuit of the motor 28 includes wires 119 and 120, the wire 120 being tapped to the wire 105 as the common return wire and the wire 119 having an interposed switch 121 by which the motor circuit may be opened and closed. Within the interior of the shell section 1a the cable 16 is carried into a junction box 122 (Figure 3) from which the wires 119 and 120 are carried to the motor 28. Beyond the junction box the cable 16 is continued by three sections 16a, 16b and 16c (Figures 25 and 26) fitted in openings in the annular walls of the respective shell sections 1a, 1b and 1c, the sections 16a, 16b and 16c enclosing the wires 104 and 105 which are suitably insulated.

In the shell section 1a the wires of the cable section 16a are connected at their lower ends to contacts 123 mounted in casings 124 of insulating material, the contacts 123 being biased by springs 125 to project slightly beyond the lower edge face of the shell section and the casings 124 being formed to prevent displacement of the contacts. In the shell section 1b the wires of the cable section 16b are connected at their upper ends to fixed contacts 126 mounted in insulating casings 127, the contacts 126 being flush with the upper edge face of the shell section and being engaged by the contacts 123. In like manner, the wires of the cable section 16b are connected at their lower ends to fixed contacts 128 mounted in insulating casings 129 and flush with the lower edge face of the section 1b. In the shell section 1c the wires of the cable section 16c are connected at their upper ends to spring biased contacts 130, the mounting of which is similar to that of the contacts 123. The contacts 130 project slightly beyond the upper edge face of the shell section 1c and are engaged by the contacts 128. The wires of the cable section 16c at their lower ends are connected to fixed contacts 131 which are insulated from the shell section and flush with its outer peripheral face. The wires 104 and 105 are continued through the cylinder 45 by a cable section 16d, at the upper end of which the wires are connected to contacts 132 carried by the head 53 in insulated relation and flush with its inner face. As the cylinder 45 nears the end of its downward stroke, the contacts 132 engage the contacts 131, the length of which is sufficient to insure the charging of the condenser to its full capacity. The cable section 16d extends into the flange 55 and the wires are carried through the recess 57 and the dog 56 and connected to the contacts 106 and 107.

The charge carriers 2 as to external features are of similar construction and as to internal features are specially formed for the support of shaped charges (Figures 13, 27 and 38) or of blasting charges (Figures 14 and 28).

The vertical wall 60 of each charge carrier 2 has a downwardly tapering outer face 133 in which the contact rings 112 and 113 are fitted.

Each wall 60 has its inner face on a downward taper 134 from its upper end for approximately a third of its extent and at the lower end of the taper is formed with an inwardly projecting shoulder 135. The inner face tapers 134 conform to the outer face tapers 133 and the internal diametric dimensions of the walls 60 above the shoulders 135 are greater than their external dimensions for the same distance above their lower edges. Thereby the charge carriers may be arranged in the magazine M in nested relation (Figures 13 and 14), the lower edge of each charge carrier above engaging in supporting relation upon the shoulder 135 of each charge carrier below. The outside diameters of the charge carriers at their upper ends conform to the inside diameters of the shell sections 1b and 1c, the charge carriers thereby being centered in the magazine and held against radial displacement.

Each carrier for a shaped charge embodying the invention (Figures 13 and 27) is formed with a web 136 which provides a shelf upon which the charge 137 (either an integral body of explosive material or composed of separate bodies) is supported and the portion of its wall 60 below the shelf 136 provides a supporting skirt 138 for holding the charge 137 in the appropriate stand-off position relatively to the target. The central opening in the charge carrier is provided by a cylindrical wall 139 which extends downward from the web 136 and is open at its lower end, the charges severally having central openings 140 which accommodate protective liners 144 in registory with the openings defined by the cylindrical walls 139. The outer annular wall 60 and the inner annular wall 139 are connected at the lower ends by a web 141 which, together with the shelf 136 and the walls 60 and 139, provides a closed air chamber 142 below the shaped charge. The chamber 142 is thus sealed against the entrance of water, the air space which it provides insuring that the gases resultant from the explosion are directed with full force against the target. When the charge carrier is deposited upon the target and the charge transfer cylinder is moving on its return stroke it is advantageous to prevent the access of water to the upper face of the charge. For this purpose covers 143 made of any appropriate material, e.g., board, metal or plastic, are provided with rest upon the charge and preferably carry the liners 144. The pipes 25 and 38 extend through the covers 143, the liners 144, and the cylindrical walls 139.

The blasting charges 145 (Figures 14 and 28) are deposited in substantially adjoining relation upon the target. The charge 145 is preferably fitted from below against a web 146 which extends inward from the wall 60 and carries a cylindrical inner wall 147 similar to the wall 139. The blasting charges have central openings to accommodate the walls 147 and their lower faces are preferably protected by covers 149 of any suitable material.

In the series of charges the liners 144 and the cylindrical walls 139 together with the walls 147 when blasting charges are included in the series provide a continuous space 148 (Figures 27 and 28) for the downward flow of flushing water. The space 148 accommodates the pipes 25 and 38, the pipe 38 having a somewhat close fit within its wall.

Each shaped charge 137 is composed of high brisance material and therefore requires for its detonation an initiating charge. In the case of shaped charges composed of an integral body of explosive material, the initiating charge 150 is preferably placed upon its upper face. In this case the charge 150 is detonated by a surrounding explosive fuse 151. The delay type igniter 118 may be of any suitable construction well known in the general art and therefore is shown only schematically. It is connected to one end of the fuse 151, and includes the usual electrically detonated cap and the powder train between the cap and the fuse 151, the cover 143 being placed over the initiating charge 150, the fuse 151 and the igniter 118.

The material of the blasting charges 145 is not of the high brisance of the material of the shaped charges and therefore the detonation of the blasting charges does not require initiating charges. The blasting charges are detonated directly by the explosive fuses 151, these, together with the delay type igniter 118, being embedded in the blasting charges.

The shaped charges may be said to be of wafer form, being relatively wide diametrically and relatively thin as compared with their diametrical dimension. In accordance with the invention each shaped charge is formed on its face which is opposed to the target with a plurality of directionalizing recesses extending from points at or near the central opening 140 to points at or near the periphery. In respect to shaped charges formed as an integral body the recesses may be of various forms, three forms being shown. In the form shown in Figures 27 and 29 the recesses 152 are conical and have an included angle of from 42° to 60°, the recesses being arranged along a number of concentric circles and being uniformly distributed over the lower face of the charge. In another form shown in Figures 30 and 31 the recesses are in the form of concentric grooves 153 of inverted V-shape in section. In another form shown in Figures 32 and 33 the recesses are in the form of radial grooves 154. In all cases the walls of the recesses are preferably covered in accordance with known practice in the use of shaped charges for well sinking or well shooting operations by liners 155 of suitable material.

The shaped charges are formed to insure that the well bore W is of sufficient diametrical dimension to leave ample clearance, i.e., the space S, between it and the opering unit, thereby to insure the free movement of the unit in the well bore, to provide adequate space for the upward flow of the flushing water and to eliminate any necessity for reaming. For these purposes the axes of the recesses have an outward inclination near the periphery of the charge. The inclination is very slight, i.e., of the order of 1° or 2°, and for the sake of clarity is greatly exaggerated in the drawings. In the case of conical recesses the outward inclination of the axes is confined to the recesses of the outer row or the outer two rows and is shown by dot and dash center lines 156 (Figure 27). In the case of concentric grooves the outward inclination of the axis is confined to the outer groove (or the two outer grooves) and is similarly shown at 157 (Figure 31). In the case of radial grooves the recesses are inclined upward adjacent the periphery and the inclination of the axes is similarly shown at 158 (Figure 33).

When the well bore reaches the stratum of oil bearing sands it may be desirable substantially to increase its diameter, that is to say to double or treble it. For this purpose a shaped charge of special form is provided (Figures 34 and 35) in which the recesses for sinking the well are downwardly directed and may be of any desired form as above described and the enlargement of the well bore is effected by laterally extending conical directionalizing recesses 159 intermediate the well sinking recesses and open to the periphery of the charge, Figure 34 assuming conical recesses or annular grooves open to the lower face of the charge and Figure 35 assuming radial grooves. In the alternative form shown in Figures 37 and 38 the shaped charge includes a plurality of shaped explosive units 160 and a supporting frame 161, preferably formed by molding and composed of a thermosetting plastic, in which the units are fitted, the units being incorporated with the frame during the molding operation. The units 160 are of high brisance material and are generally of cylindrical form, each unit being formed with a downwardly facing conical directionalizing recess 162, the walls of which are covered by a liner 163 in accordance with well known practice. The frame 161 includes annular elements 164, open at both ends, in which the units 160 are severally arranged. The units 160 and the annular elements 164 are disposed in concentric rows (the number depending upon the particular diameters of the unit) and in each row and in adjoining rows the annular elements are connected serially by integral webs 165. Each explosive unit 160 has associated with it and adjoining its upper face an initiating charge 166, these, like the units 160, being arranged within the annular elements 164. The explosive units 160 may be of varying sizes within a range of the order of one-half inch in diameter and one-half inch in depth to one and one-quarter inch in diameter and one and one-quarter inch in depth. The units 160 of the outer row preferably have their axes inclined outward at a slight angle (for the purpose above described) which in Figure 38 is indicated in exaggerated form by the center line 156a. The annular elements 164 of the outer row, of course, have the central axes of their openings similarly and coincidentally inclined and their outer cylindrical walls along normal central axes indicated by center lines 156b. In this alternative form the explosive fuse consists of a frame 151a which includes concentric rings of primacord, one for each annular row of explosive units, three such rings, namely an outer ring 167, an intermediate ring 168 and an inner ring 169, being shown in the drawings. The outer ring 167, like the explosive fuse 151 above described, is connected to the delay action igniter 118. The frame 151a includes radial sections of primacord 170 which connect the several explosive rings and are provided in any desired number, four of such sections being shown in the drawings. The several rings and the connecting sections 170 rest upon the upper faces of the initiating charges 116. The igniter 118 directly detonates the outer explosive ring 167 whereupon, by virtue of the connections 170, the frame as a whole is detonated virtually at the same instant with resultant simultaneous detonation of the initiating charges 166 and the explosive units 160.

In this alternative construction the shaped charge has the characteristics above described, that is to say it includes a multiplicity of downwardly facing directionalizing recesses simultaneously generating penetrating jets and is of wafer-like form in that its depth is quite shallow as compared with known shaped charges for use in well sinking or well shooting and its area is many times greater than its depth.

The charge carrier for the alternative form of shaped charge, shown in broken lines in Figure 38, is of the substantial construction of the charge carrier shown in Figure 27 and is molded separately from the frame 161. In completing the charge carrier assembly the frame 161 is fitted upon the shelf 136 with the annular elements 164 of the outer annular row adjoining the inner face of the carrier. As in the construction shown in Figure 27 the shaped charge together with the explosive fuse is protected by a cover, here designated 143a and which carries a liner 144a extending to the shelf 136.

We claim:

1. A detonative element for use in a well sinking operation comprising a carrier and an explosive charge associated with the carrier, the carrier being composed of frangible material which is shattered by the detonation of the charge and having outer and inner concentric annular walls and a web extending between the walls in a plane between the ends of the outer wall, the inner wall providing a passage for the flow of water used for flushing the detritus resultant from the detonation of a similar previously exploded charge, and the charge being of annular outline and of wafer form dimensionally, the charge having inner and outer peripheral faces adjoining the walls and substantially flat faces extending between the peripheral faces, the flat faces having areas which in radial extent are several times in excess of the thickness of the charge, the charge being fitted upon the web with one of its flat faces in a plane in which, in the use of the detonative element, it will be opposed to the target surface constituted by the bottom of the well bore, the outer annular wall having its outer face tapered between its ends and its inner face conformably tapered from one end for approximately one-third of its extent and having an inwardly projecting annular shoulder located beyond the web and at the narrow end of the taper of its inner face, the internal diametric dimension of the outer annular wall beyond the shoulder being suitably greater than its external diametric dimension for the same distance above the narrow end of the external taper, thereby to enable the carrier to be arranged in nested relation to an adjacent similar carrier with the shoulder of the carrier providing support for a carrier next above.

2. A detonative element as set forth in claim 1 wherein the explosive charge is a shaped charge and is characterized by a multiplicity of directionalizing recesses formed in the flat face of the charge which is opposed to the target surface and wherein the carrier is formed to provide an enclosed air chamber below the web and having four walls, the web and the annular walls providing three walls of the air chamber, the fourth wall of the air chamber being of frangible material and extending between the annular walls in a plane parallel to the plane of the web.

3. A detonative element as set forth in claim 1 wherein the explosive charge is a shaped charge and is characterized by a multiplicity of directionalizing recesses formed in its flat face which is opposed to the target surface and the outer annular wall of the carrier has a portion which extends beyond the web and provides a skirt for supporting engagement with the target surface and for holding the shaped charge in the appropriate stand-off position relatively to the target surface.

4. A detonative element as set forth in claim 1 wherein an explosive fuse and an electrically actuated igniter connected to the fuse are associated with the explosive charge and condenser elements are incorporated in the outer annular wall of the carrier for operative connection electrically to the igniter associated with the charge.

5. A detonative element as set forth in claim 1 wherein the explosive charge is a shaped charge having a multiplicity of directionalizing recesses in its face opposed to the target surface, certain of the recesses being adjacent the outer peripheral face of the charge and having their axes inclined downward and outward and the remainder of the recesses being distributed throughout the area of the charge and having their axes normal to said substantially flat faces.

6. A detonative element as set forth in claim 1 wherein the explosive charge is a shaped charge having a multiplicity of directionalizing recesses, certain of which are formed along the outer peripheral face of the charge and have their axes directed radially and others of which are formed in the flat face of the charge which is opposed to the target surface and have their axes in normal to said substantially flat faces.

7. A detonative element as set forth in claim 1 wherein the explosive charge is a shaped charge having a multiplicity of directionalizing recesses formed in its flat face which is opposed to the target surface, the recesses having their axes normal to said substantially flat faces and the charge consisting of an integral body of explosive material.

8. A detonative element as set forth in claim 1 wherein the explosive charge is a shaped charge having a multiplicity of directionalizing recesses in its flat face which is opposed to the target surface and comprises a frame of frangible material having distributed throughout its area a multiplicity of openings extending to the face which is opposed to the target surface and shaped units of explosive material severally fitted in the openings, each unit having a face opposed to the target surface and formed with a downwardly facing jet directionalizing recess.

References Cited in the file of this patent
UNITED STATES PATENTS

| | | |
|---|---|---|
| 2,048,677 | Berteling | July 28, 1936 |
| 2,587,243 | Sweetman | Feb. 26, 1952 |
| 2,587,244 | Sweetman | Feb. 26, 1952 |
| 2,590,671 | Baker | Mar. 25, 1952 |
| 2,679,380 | Sweetman | May 25, 1954 |
| 2,682,834 | Church et al. | July 6, 1954 |
| 2,706,949 | Kessenich | Apr. 26, 1955 |
| 2,757,611 | Church et al. | Aug. 7, 1956 |
| 2,789,504 | McCloud et al. | Apr. 23, 1957 |
| 2,856,850 | Church et al. | Oct. 21, 1958 |
| 2,887,953 | Mager | May 26, 1959 |